(12) United States Patent
Kabata et al.

(10) Patent No.: US 7,602,089 B2
(45) Date of Patent: Oct. 13, 2009

(54) ROTARY ELECTRIC MACHINE

(75) Inventors: Yasuo Kabata, Kanagawa (JP); Katsuya Yamashita, Tokyo (JP); Yoshihiro Taniyama, Tokyo (JP); Tadashi Tokumasu, Tokyo (JP); Mikio Kakiuchi, Kanagawa (JP); Koji Matsuyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 226 days.

(21) Appl. No.: 11/761,705

(22) Filed: Jun. 12, 2007

(65) Prior Publication Data

US 2008/0012437 A1 Jan. 17, 2008

(30) Foreign Application Priority Data

Jun. 29, 2006 (JP) ............... 2006-179589

(51) Int. Cl.
*H02K 9/00* (2006.01)
(52) U.S. Cl. ............... 310/54; 310/53; 310/57
(58) Field of Classification Search ............. 310/52–59, 310/61–63, 254, 261
See application file for complete search history.

(56) References Cited

U.S. PATENT DOCUMENTS

| | | | | | |
|---|---|---|---|---|---|
| 3,755,702 | A | * | 8/1973 | Willyoung | 310/53 |
| 4,056,745 | A | * | 11/1977 | Eckels | 310/52 |
| 4,895,005 | A | * | 1/1990 | Norbeck et al. | 62/506 |
| 4,959,569 | A | * | 9/1990 | Snuttjer et al. | 310/53 |
| 5,189,325 | A | * | 2/1993 | Jarczynski | 310/54 |
| 5,345,777 | A | * | 9/1994 | Sekino et al. | 62/244 |
| 5,632,157 | A | * | 5/1997 | Sekino et al. | 62/244 |
| 5,697,207 | A | * | 12/1997 | Cromer et al. | 60/772 |
| 5,939,808 | A | * | 8/1999 | Adames | 310/89 |
| 6,222,289 | B1 | * | 4/2001 | Adames | 310/54 |
| 6,880,352 | B2 | * | 4/2005 | Yamasaki et al. | 62/238.1 |
| 2005/0172651 | A1 | | 8/2005 | Drubel et al. | |

FOREIGN PATENT DOCUMENTS

JP 11-98767 4/1999

* cited by examiner

*Primary Examiner*—Thanh Lam
(74) *Attorney, Agent, or Firm*—Oblon, Spivak, McClelland, Maier & Neustadt, L.L.P.

(57) ABSTRACT

A rotary electric machine includes: a stator, a rotor and rotor fans contained in a closed type frame. The cooling gas is circulated in the frame by the rotor fans and warmed as a result of heat exchange with the stator and the rotor is cooled by a gas cooler. A heat pump is adapted to use cooling water or ambient air as high temperature heat source and liquid coolant as low temperature heat source. A liquid coolant circulation system for supplying liquid coolant to the heat exchange section of the gas cooler is provided. The liquid coolant is cooled by the heat pump and is supplied to the heat exchange section of the gas cooler by means of the coolant circulation system.

11 Claims, 20 Drawing Sheets though only a single gas cooler 6 is shown in the schematic view of FIG. 19, normally a plurality of gas coolers are arranged in series, in parallel or in series-parallel. While tap water is normally used as coolant, antifreeze liquid, river water, sea water or some other liquid coolant may alternatively be used under certain circumstances. Therefore, cooling water is referred to as main cooling water here.

ROTARY ELECTRIC MACHINE

CROSS REFERENCE TO RELATED APPLICATIONS

This application is based upon and claims the benefit of priority from the prior Japanese Patent Application No. 2006-179589, filed on Jun. 29, 2006, the entire content of which is incorporated herein by reference.

BACKGROUND OF THE INVENTION

The present invention relates to a rotary electric machine such as a gas cooled generator. More particularly, the present invention relates to a rotary electric machine having an enhanced cooling effect.

FIG. 19 schematically illustrates a cooling system of a closed type rotary electric machine.

Referring to FIG. 19, reference numeral "1" denotes a closed type rotary electric machine which may typically be a turbine generator arranged in a closed type frame 2. The machine 1 comprises a stator 3 which includes an annular stator core $3_{-1}$ and a stator coil $3_{-2}$ contained in the slot of the stator core $3_{-1}$. The machine 1 further comprises a rotor 4 provided with a field coil (not shown) wound around it and arranged concentrically relative to the stator core $3_{-2}$ with an air gap interposed between them. The machine 1 comprises rotor fans 5 fitted to the end sections of the shaft of the rotor 4, and a gas cooler 6 arranged behind (above in the drawing) the stator 3.

Cooling gas 7 such as air or hydrogen gas is contained in the closed frame 2 and is driven by the rotor fans 5 to flow and circulate as indicated by arrows 8 and 9 so as to cool the stator 3 and the rotor 4. The cooling gas 7 that has been warmed is then cooled by a gas cooler 6.

While the flow path of cooling gas 7 in the rotary electric machine 1 is schematically illustrated in FIG. 19 in a simplified manner, the actual gas flow path is a complex one as the stator core $3_{-1}$ is divided by a gas guide plate into a gas supply section and an exhaust section as shown in FIGS. 12 and 13 of Japanese Patent Application Laid-Open Publication No. 2001-29806 (the entire contents of which are incorporated herein by reference).

The above-described gas cooler 6 is provided with a heat exchange tube 13 typically formed by using a finned tube. As cooling water that is at about 30 to 40° C. is supplied into the heat exchange tube 13 from a main cooling water system 10, the cooling gas 7 is cooled to about 40 to 50° C. In FIG. 19, reference numeral "11" denotes the supply port of the cooling water system and reference numeral "12" denotes the discharge port of the cooling water system. While only a single gas cooler 6 is shown in the schematic view of FIG. 19, normally a plurality of gas coolers are arranged in series, in parallel or in series-parallel. While tap water is normally used as coolant, antifreeze liquid, river water, sea water or some other liquid coolant may alternatively be used under certain circumstances. Therefore, cooling water is referred to as main cooling water here.

While the cooling gas 7 contained in the closed frame 2 is driven to flow and circulate to cool the stator 3 and the rotor 4 in the above-described cooling system, such a cooling system may not be sufficient when the rotary electric machine 1 is a large capacity machine. Then, a water-cooled stator coil system is adopted in addition to the above-described cooling system. With a water-cooled stator coil system, the stator coil $3_{-2}$ of the rotary electric machine comprises hollow conductors and a coolant is made to flow in the hollow part of the stator coil $3_{-2}$ to directly cool the stator coil $3_{-2}$ (See Japanese Patent Application Laid-Open Publication No. (Hei)11-98767). FIG. 20 schematically illustrates the arrangement for cooling a stator coil by means of a water-cooled stator coil system. This arrangement will be described below.

In the case of a rotary electric machine additionally provided with a water-cooled stator coil system, the cooling gas 7 is driven to flow and circulate in the machine so as to cool the components of the machine other than the stator coil $3_{-2}$. Thus, the arrangement of the circulation path and the heat transfer route of the cooling gas 7 and the configuration of the main cooling water system 10 are similar to those schematically illustrated in FIG. 19. Therefore, the gas cooler 6 and the arrows 8, 9 indicating the flow of the cooling gas 7 are not shown in FIG. 20.

Pure water is used as coolant to be flown into a stator coil 38 that is electrically energized in a rotary electric machine with a water-cooled stator coil system because pure water is electrically highly insulating. While pure water is supplied from a pure water supply system 36 comprising a pure water producing apparatus, a pure water storage tank and a circulating pump, although not shown in FIG. 20.

Referring to FIG. 20, the pure water is pressurized by a circulating pump (not shown) arranged in the pure water supply system 36 and supplied to the stator coil 38 in the rotary electric machine 1 by way of a collecting tube such as one of the headers. Then, it flows in the stator coil 38 in the axial direction to directly cool the stator coil 38. The pure water that is warmed as a result of cooling the stator coil 38 is collected in a collecting tube such as the other header and taken out to the outside of the rotary electric machine 1. Then, it is cooled in a pure water cooler 37 as a result of heat exchange with cooling water to become ready for flowing again to the pure water supply system 36 to circulate.

The upper limit of the temperature of the stator coil $3_{-2}$ and that of the rotor coil of a rotary electric machine of the type under consideration are strictly defined because of the thermal limit of the insulations of the coils.

On the other hand, the temperature of the cooling gas 7 that has exchanged heat in the gas cooler 6 indicated by the arrow 9 in FIG. 19 is influenced by the temperature of the cooling water that is supplied to the gas cooler 6. Since the temperature of the cooling water that is being supplied can vary depending on the machine, the temperature rise that the stator coil $3_{-2}$ and other components are allowed also varies from machine to machine. Thus, there is a problem that the dimensions and the flow rate of cooling gas to be used have to be designed for each rotary electric machine.

Additionally, when rotary electric machines of the same design are applied to different cooling water temperatures, there is a problem that the output of the rotary electric machine is limited due to the temperature limitation when the temperature of the cooling water that is actually supplied is higher than the design temperature of cooling water, whereas an unnecessarily large rotary electric machine has to be applied when the temperature of the cooling water that is actually supplied is lower than the design temperature of cooling water.

Still additionally, since rotary electric machines are generally designed to achieve the highest efficiency at the design point, there is a problem that the efficiency of the rotary electric machine decreases when it is driven to operate with a cooling water temperature that is different from the design temperature.

In view of the above-identified circumstances, it is therefore an object of the present invention to provide a rotary electric machine that can be driven to operate when the temperature of the cooling water supplied to the gas cooler thereof varies and is applicable to various conditions of cooling water and a wide capacity range with the same design of the rotary electric machine main body and also capable of being operated efficiently responding to the operating condition of the machine.

BRIEF SUMMARY OF THE INVENTION

According to an aspect of the present invention, there is provided a rotary electric machine comprising: a stator; a rotor; rotor fans; a closed type frame containing the stator, the rotor and the rotor fans; a gas cooler for cooling gas that has been warmed as a result of being circulated in the frame by the rotor fans and exchanging heat with the stator and the rotor; a heat pump utilizing a first coolant as a high temperature heat source and a second coolant as a low temperature heat source; and a second coolant circulation system for supplying the second coolant to a heat exchange section of the gas cooler; wherein the second coolant is cooled by the heat pump and supplied to the heat exchange section of the gas cooler by the second coolant circulation system.

According to another aspect of the present invention, there is provided a rotary electric machine comprising: a stator having a stator coil, a rotor; rotor fans; a frame containing the stator, the rotor and the rotor fans; a pure water supply system for supplying pure water into the stator coil; a pure water cooler for cooling the pure water; a heat pump utilizing a first coolant as a high temperature heat source and a second coolant as a low temperature heat source; and a second coolant circulation system for supplying the second coolant to the heat exchange section of the pure water cooler, wherein the second coolant is cooled by the heat pump and supplied to a heat exchange section of the pure water cooler.

According to another aspect of the present invention, there is provided a rotary electric machine comprising: a stator having a stator coil; a rotor; rotor fans; a frame containing the stator, the rotor and the rotor fans; a heat pump utilizing a first coolant as a high temperature heat source and the pure water as a low temperature heat source; and a pure water supply system for supplying pure water into the stator coil, wherein pure water is cooled by the heat pump and supplied to the stator coil.

DETAILED DESCRIPTION OF THE INVENTION

Figure 1:
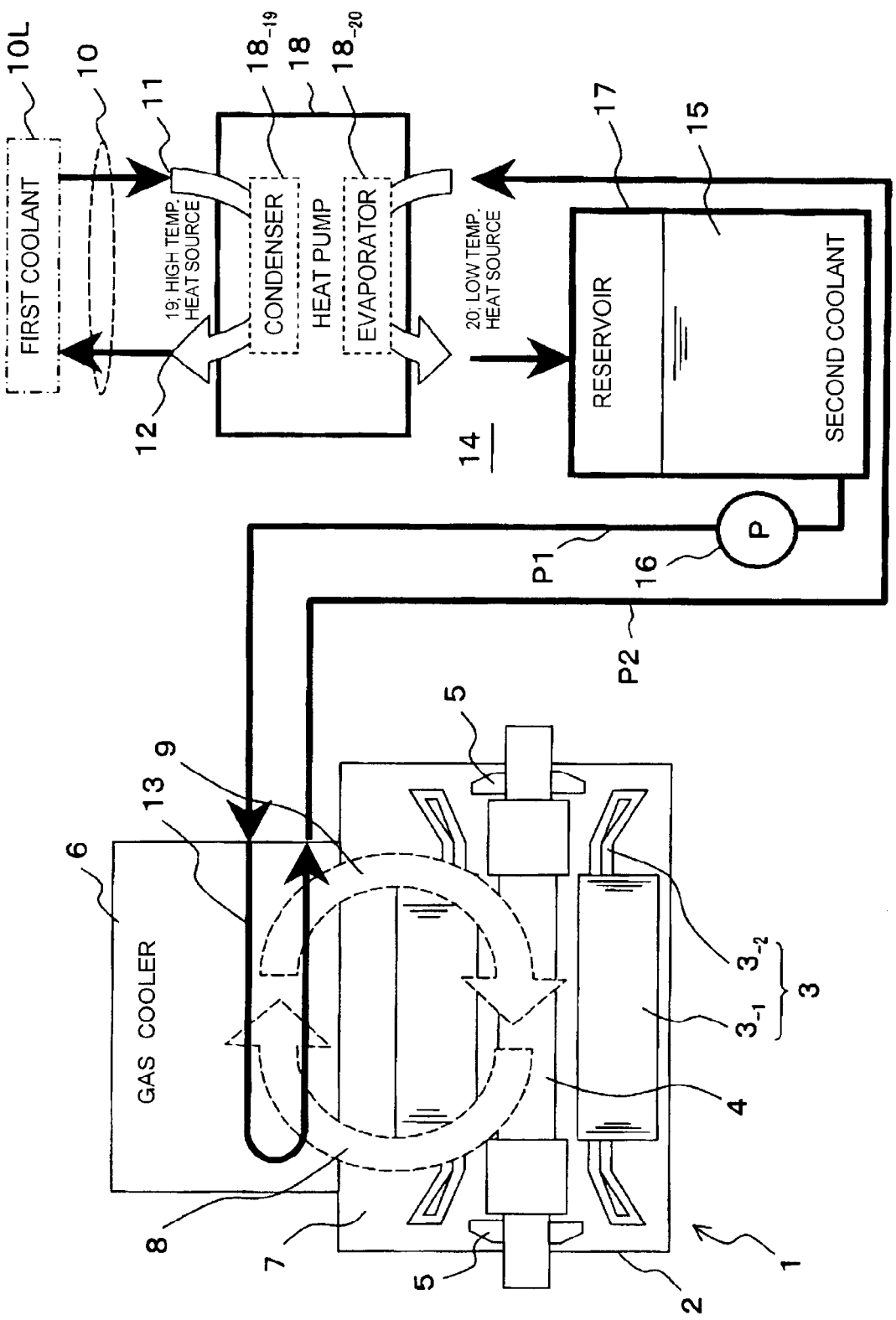
FIG. 1 is a schematic illustration of a first embodiment of a rotary electric machine according to the present invention.

Now, the present invention will be described in greater detail by referring to the accompanying drawings that illustrate preferred embodiments of rotary electric machines according to the invention. Throughout the drawing, the same components are denoted respectively by the same reference symbols, and repetitive explanation is omitted.

First Embodiment

FIG. 1 is a schematic illustration of the first embodiment of a rotary electric machine according to the present invention.

[Configuration]

Figure 19:
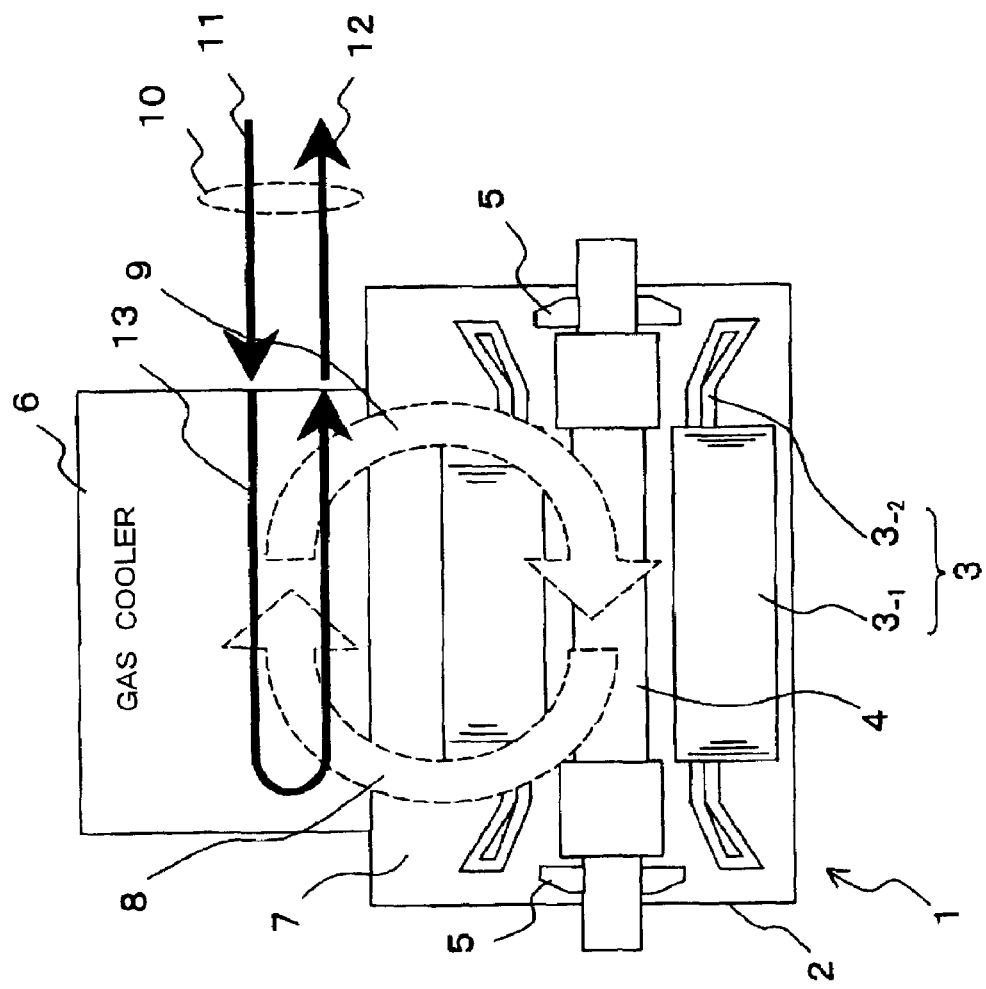
FIG. 19 is a schematic illustration of the basic structure of a known rotary electric machine.
Figure 20:
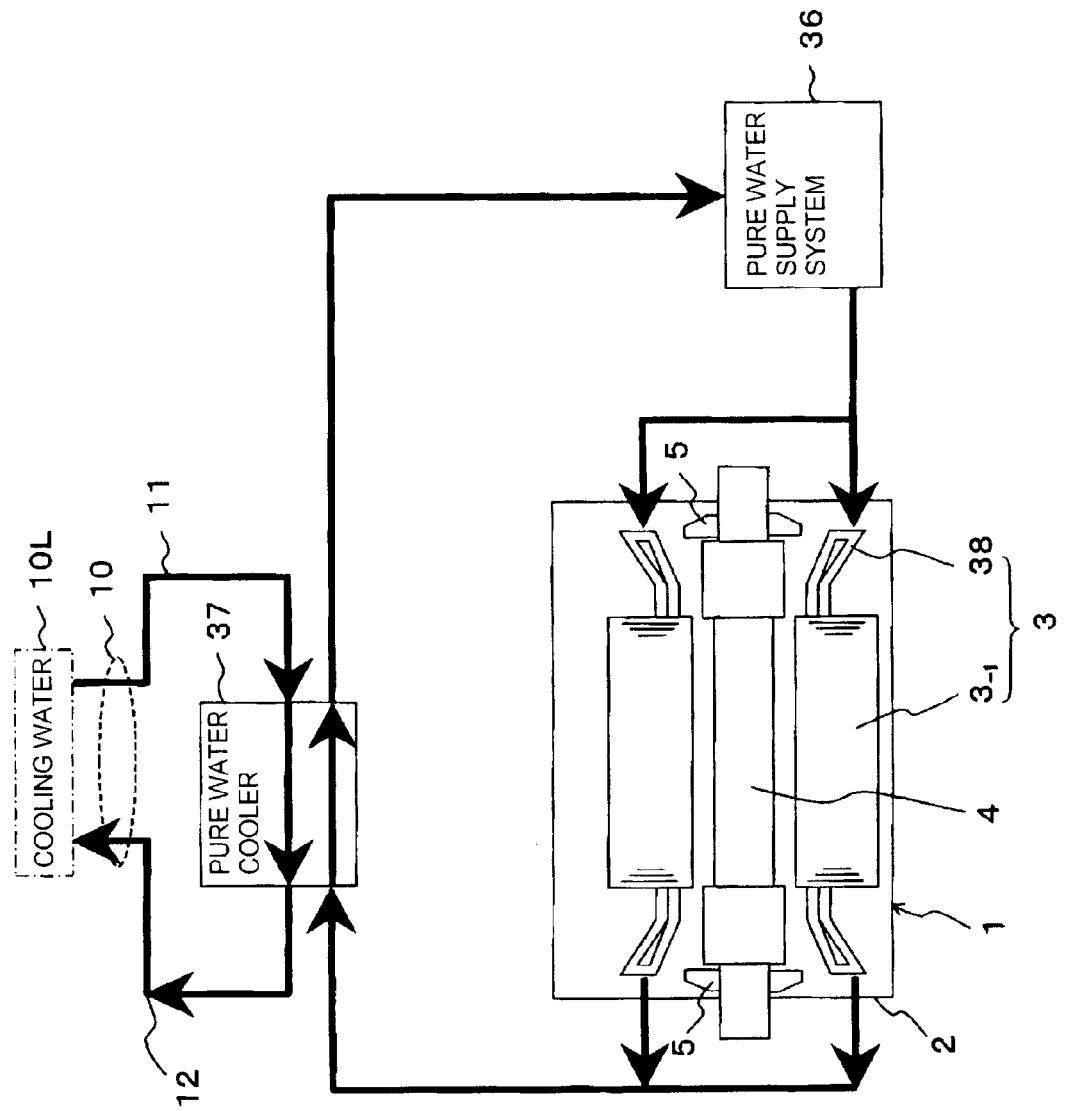
FIG. 20 is a schematic illustration of the basic structure of a water-cooled stator coil cooling system.

In the conventional rotary electric machine described above by referring to FIG. 19, main cooling water 10L (to be referred to as the first coolant hereinafter for the purpose of convenience) is made to flow in the cooling tube 13 of the gas cooler 6 to cool cooling gas 7. In the present embodiment, a second coolant circulation system 14 for circulating liquid coolant such as cooling water to be used as intermediate coolant is connected. The intermediate coolant is prepared separately relative to the first coolant 10L in the cooling tube 13 of the gas cooler 6. A heat pump 18 is inserted between the second coolant circulation system 14 and the first coolant system 10. The second coolant 15 is cooled by means of a heat pump 18.

Although the underlying principle of a heat pump 18 is well known, it will be described briefly below. An evaporator and a condenser are arranged respectively at the low temperature heat source side and at the high temperature heat source side and an expansion valve and a compressor are arranged on the way of the piping connecting them to flow actuator coolant such as CFCs, ammonium or carbon dioxide. Thus, the low temperature heat source is cooled as heat is pumped up (deprived) from the low temperature heat source when the liquid working fluid is made to exchange heat with the low temperature heat source in the evaporator. Then, the working fluid is turned into liquid as it is compressed by the compressor and condensed by the condenser to release heat to the main cooling water that is the high temperature heat source.

With regard to this embodiment, the above-described main cooling water 10L that operates as the first coolant is the high temperature heat source 19 and the separate cooling water 15 that is the intermediate coolant that operates as the second coolant is the low temperature heat source 20. Thus, the heat pump 18 pumps up heat from the second coolant 15 and feeds the first coolant 10L with heat. The second coolant 15 that flows through the second coolant circulation system 14 is cooled as the heat pump 18 pumps up heat.

The heat pump 18 of this embodiment is a so-called water-cooled type heat pump adapted to cool condensation heat of the actuator medium with water. The heat pump 18 may alternatively be of an air-cooled type adapted to cool the actuator medium with air as will be described hereinafter by referring to other embodiments. Then, the main cooling water 10L is replaced by air. The heat pump 18 may be a refrigerator.

The above-described second coolant circulation system 14 includes: a reservoir 17 storing the second coolant 15; a supply piping P1 for connecting the reservoir 17 and the entrance of the cooling tube 13 that is the heat exchanging section of the gas cooler 6; a circulation pump 16 arranged midway on the supply piping P1 to circulate the second coolant 15; an evaporator $18_{-20}$ of the heat pump 18; and a return piping P2 connecting the exit of the cooling tube 13, the evaporator $18_{-20}$ of the heat pump 18 and the reservoir 17.

On the other hand, the first coolant circulation system 10 includes a cooling water source (not shown) for supplying main cooling water 10L, a condenser $18_{-19}$ of the heat pump 18, and the piping P0 connecting the cooling water source and the condenser $18_{-19}$. Various valves including flow rate control valves are connected to the piping P0 of the first coolant system 10 and the pipings P1, P2 of the second coolant circulation system 14 by means of flanges. However, those valves are not shown, and only the flow routes are shown in FIG. 1, because the valves are not directly related to the present invention.

The circulation pump 16 is arranged at the immediate downstream side of the reservoir 17 in FIG. 1. However the position of arrangement of the circulation pump 16 is not limited there and may alternatively be arranged anywhere else on the second coolant circulation system 14. For example, the circulation pump 16 may be arranged at the return piping P2. The second coolant 15 is supplied from the single second coolant circulation system 14 to the single gas cooler 6 in the arrangement of FIG. 1. However, plurality of gas coolers may alternatively be arranged in series, in parallel or in series-parallel. Then, the second coolant 15 is supplied from the single second coolant circulation system 14 to a plurality of gas coolers.

Although not shown in FIG. 1, a cooling apparatus such as a cooling tower maybe arranged on the first coolant system 10 so as to form a circulation loop. Alternatively, the first coolant system 10 may be configured as an open system that uses river water or sea water and hence does not circulate water. Otherwise, the first coolant system 10 is same in configuration as conventional ones.

[Operation]

Now, the operation of this embodiment having the above-described configuration will be described below.

The second coolant 15 stored in the reservoir 17 is pressurized by the circulation pump 16. The second coolant 15 is then supplied to the cooling tube 14 that is the heat exchange section of the gas cooler 6 by way of the supply piping P1. The cooling gas 7 is blown by the rotor fans 5 arranged at the shaft ends of the rotary electric machine 1. The cooling gas 7 cools the stator 3 and the rotor 4 and becomes warmer before it is fed to the space section where the cooling tube 13 of the gas cooler 6 is arranged as indicated by the arrow 8. The cooling gas 7 that is cooled near the cooling tube 13 is then driven to circulate as indicated by the arrow 9 to cool the stator 3 and the rotor 4 once again.

Meanwhile, the second coolant 15 supplied to the cooling tube 14 of the gas cooler 6 exchanges heat with the warm cooling gas 7 and then fed to the evaporator $18_{-20}$ of the heat pump 18 by way of the return piping P2 as the low temperature heat source 20. On the other hand, the cooling water that is the first coolant is supplied to the condenser $18_{-19}$ of the heat pump 18 by way of the cooling water supply port 11 arranged at an end of the piping P0 of the first coolant system 10.

The second coolant 15 that is supplied from the evaporator $18_{-20}$ as the low temperature heat source 20 is deprived of heat to become cool due to the operation of the heat pump 18 and then ejected into the reservoir 17. The cooling water that is the first coolant is heated by the heat deprived from the second coolant 15 due to the operation of the heat pump 18, ejected from the cooling water discharge port 12 and then cooled by the cooling tower (not shown) so as to be circulated to the condenser $18_{-19}$ of the heat pump 18 or discharged to a river or the like without being circulated.

Thus, the second coolant 15 that is the coolant of the gas cooler 6 is cooled due to the operation of the heat pump 18. Therefore, it is possible to raise the cooling performance of the gas cooler 6 compared with the conventional art that employs the first coolant as the coolant of the gas cooler 6. Then, as a result, it is possible to intensify the effect of cooling the components of the rotary electric machine 1 such as the stator coil $3_{-2}$ without altering the design and the structure of the rotary electric machine 1.

Now, the specific advantages of this embodiment will be described below.

Assume, for example, that the rotary electric machine is designed to operate under certain conditions including that the temperature of the cooling water is 30° C., that the temperature of the cooling gas 7 that is cooled by the gas cooler 6 as indicated by the arrow 9 in FIG. 1 is 40° C. and that the upper limit of the temperature of the stator coil $3_{-2}$ is 110° C. The rotary electric machine has components whose temperatures are subjected to limitations such as the rotor coil other than the stator coil. However, this embodiment will be described in terms of the temperature of the stator coil, because the advantages of the present invention remain substantially same.

Assume also that the temperature of the cooling water introduced for the rotary electric machine 1 is 40° C., which is 10K higher than the design temperature. Since the cool cooling gas 7 indicated by the arrow 9 in FIG. 1 in the rotary electric machine 1 exchanges heat with the cooling water in the case of the conventional art, its temperature would rise substantially by the temperature discrepancy (10K) of the cooling water to become 50° C. Additionally, since the stator coil $3_{-2}$ is cooled by the cooling gas 7 that is as hot as 50° C., its temperature would rise also substantially by the temperature discrepancy (10K) of the cooling water. Then, as a result, the temperature of the stator coil $3_{-2}$ would become as high as 120° C.

The upper limit of the temperature of the stator coil $3_{-2}$ cannot be raised beyond 110° C. because of the withstand temperature of the insulation thereof. Then, it would not be possible to operate the rotary electric machine 1 when the temperature of the stator coil $3_{-2}$ is as high as 120° C. Therefore, it would be necessary to redesign the rotary electric machine 1 in order to make it operational under the condition that the temperature of the first coolant (cooling water) 10L is higher than the design temperature of 30° C. by 10K for the rotary electric machine.

On the other hand, with this embodiment, the rotary electric machine 1 can be designed such that the cooling water is selected as the medium of the second coolant 15, the design flow rate of the gas cooler 6 is used for the circulation flow rate of the second coolant circulation system 14 and the temperature of the second coolant 15 ejected from the heat pump 18 is 30° C. Then, it is possible to make the temperature of the second coolant equal to 30° C. from cooling water that is as hot as 50° C. Then, it is possible to operate the rotary electric machine 1 without changing the design and the configuration of the rotary electric machine 1 by supplying the obtained 30° C. second coolant 15 to the cooling tube 13 of the gas cooler 6. Then, the machine 1 can be operated under the conditions that the temperature of the low temperature cooling gas in the rotary electric machine 1 is 40° C. and that the upper limit of the temperature of the stator coil is 110° C.

Additionally, it is possible to further reduce the temperature of the stator coil $3_{-2}$ when the temperature of the second coolant 15 ejected from the heat pump 18 is designed to be lower than 30° C. For example, it is possible to make the temperature of the low temperature cooling gas and that of the stator coil in the rotary electric machine 1 substantially equal to 20° C. and 90° C. respectively, when the temperature of the second coolant 15 ejected from the heat pump 18 is designed to be 10° C. Since some of the members of the rotary electric machine are degraded quickly when the operating temperature of the rotary electric machine is high, it is possible to improve the reliability of the rotary electric machine by reducing the operating temperature.

Additionally, it is possible to raise the output power level under these conditions until the temperature of the stator coil gets to the upper limit (110° C.). Thus, it is possible to expand the applicable capacity zone of the rotary electric machines of the same design.

On the other hand, it is possible to reduce the circulation flow rate of the cooling gas 7 in the rotary electric machine 1 to the level corresponding the temperature upper limit of the stator coil (110° C.) by modifying the design of the rotor fans 5 so as to reduce the flow rate of the cooling gas 7 circulating in the closed type frame 2. In such a case, it is possible to improve the efficiency of the rotary electric machine 1 because the power required to circulate the cooling gas 7 is reduced. Generally, the power required to circulate cooling gas changes in proportion to the cube of the gas flow rate. Therefore, a remarkable improvement of the efficiency of a rotary electric machine can be expected particularly when the rotary electric machine is of the air-cooled type.

Additionally, when the design temperature of the second coolant 15 is lower than 30° C., it is possible to reduce the circulation flow rate of the second coolant so as to make the temperature of the low temperature cooling gas in the rotary electric machine 1 equal to the design temperature of 40° C. Then, it is possible to reduce the power of the circulation pump 16 of the second coolant circulation system 14.

[Advantages]

As described above, the second coolant 15 that is the coolant of the gas cooler 6 is cooled by the heat pump 18 in this embodiment. Therefore, it is possible to improve the cooling performance of the gas cooler 6 if compared with the conventional art where the first coolant (cooling water) 10L is used as the cooling medium of the gas cooler 6. Then, as a result, it is possible to expand the applicable capacity range of the rotary electric machine and improve the efficiency and the reliability of the rotary electric machine.

The advantages of the present invention are described above in terms of an instance where the design of the rotary electric machine is not altered in order to stress the fact that the present invention can be applied to existing rotary electric machines. It is possible to provide a highly efficient downsized rotary electric machine by designing the gas cooler 6 so as to use the second coolant 15 that is cooled in advance.

While the reservoir 17 is provided to store the second coolant 15 in this embodiment, the reservoir 17 may be omitted if the total length of the piping is sufficiently long and can secure a sufficient quantity of coolant for the second coolant circulation system.

The conventional art requires consideration of the degradation with time of the performance of the gas cooler 6 due to contamination of the cooling medium for designing the gas cooler 6. On the other hand in this embodiment, the second coolant 15 that is supplied to the gas cooler 6 operates in a closed circulation system that is independent from the first coolant system 10, it is possible to reduce the degradation with time of the performance of the gas cooler 6 and hence design a compact gas cooler 6 if compared with the conventional art.

Additionally, the second coolant circulation system 14 is independent from the first coolant system 10 in this embodiment. Therefore, it is possible to select a liquid coolant that is different from the first coolant (main cooling water) 10L for the second coolant 15. Still additionally, the quality of the second coolant 15 can be managed with ease in this embodiment, so that it is possible to reduce the degradation with time of the performance of the gas cooler 6. It may be needless to say that a cooling medium that is same as the first coolant (main cooling water) can be selected for the second coolant 15.

Second Embodiment

Figure 2:
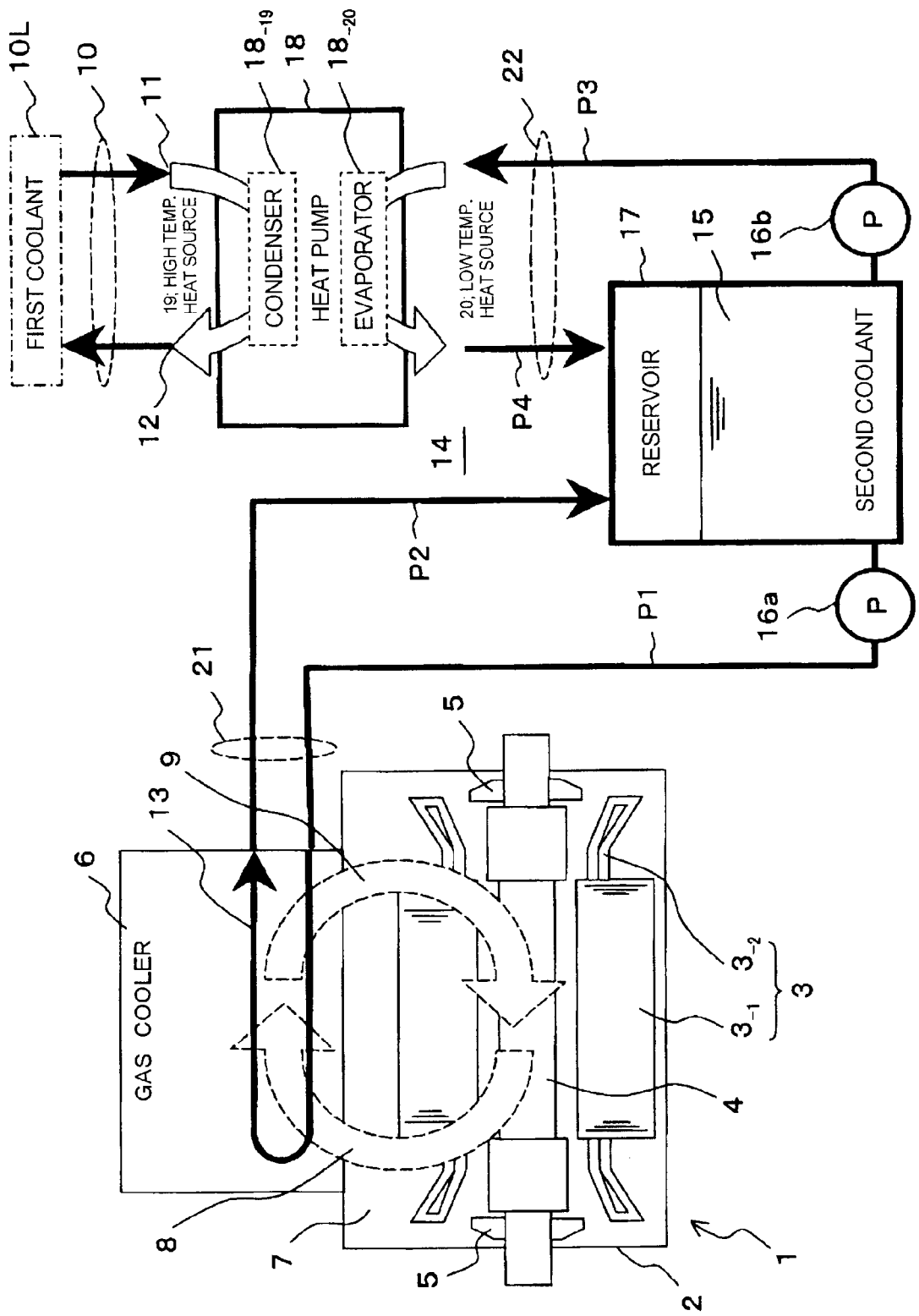
FIG. 2 is a schematic illustration of a second embodiment of a rotary electric machine according to the present invention.

FIG. 2 is a schematic illustration of the second embodiment of a rotary electric machine according to the present invention.

[Configuration]

The second embodiment of the present invention is characterized in that the second coolant circulation system 14 of the first embodiment is partly altered for this embodiment by dividing it into two circulation systems 21 and 22.

More specifically, the first system 21 is a gas cooler circulation system 21 where: the second coolant 15 stored in the reservoir 17 is led to the cooling tube 13 of the gas cooler 6 by way of the circulation pump 16a and the supply piping P1, and the second coolant 15 exchanges heat with high temperature cooling gas 8 in the cooling tube 13 before it is returned to the reservoir 17 by way of the return piping P2. The second system 22 is a heat pump circulation system 22 where: the second coolant 15 stored in the reservoir 17 is supplied to the evaporator $18_{-20}$ of the heat pump 18 by means of the circulation pump 16b arranged at a supply piping P3 and then returned to the reservoir 17 by way of a return piping P4. Otherwise, the configuration of the second embodiment is same as that of the embodiment of FIG. 1.

The gas cooler circulation system 21 is designed to circulate the second coolant 15 between the reservoir 17 and the gas cooler 6 by means of the circulation pump 16a and by way of the supply piping P1 and the return piping P2. The heat pump circulation system 22 is designed to circulate the second coolant 15 between the reservoir 17 and the evaporator 18₋₂₀ of the heat pump 18 by means of the circulation pump 16b on the supply piping P3 and the return piping P4 arranged independently relative to the supply piping P1 and the return piping P2. The circulation pump 16b is arranged immediately downstream relative to the reservoir in FIG. 2. The circulation pump 16a of the gas cooler circulation system 21 and the circulation pump 16b of the heat pump circulation system 22 are designed to be driven independently relative to each other.

[Operation]

Now, the operation of this embodiment having the above-described configuration will be described below.

The second coolant 15 stored in the reservoir 17 is supplied to the gas cooler 6 and the evaporator 18₋₂₀ of the heat pump 18 and then returned to the reservoir 17 by way of the gas cooler circulation system 21 and the heat pump circulation system 22 respectively.

More specifically, in the gas cooler circulation system 21, the pressure of the second coolant 15 is raised by the circulation pump 16a and the pressurized second coolant 15 is then supplied to the gas cooler 6 by way of the supply piping P1. The second coolant 15 exchanges heat with the high temperature cooling gas 8 there. Then, it is ejected back into the reservoir 17 by way of the return piping P2.

On the other hand, in the heat pump circulation system 22, the pressure of the second coolant 15 is raised by the circulation pump 16b and the pressurized second coolant 15 is then fed into the evaporator 18₋₂₀ of the heat pump 18 by way of the supply piping P3. The second coolant 15 is then deprived of heat due to the operation of the heat pump 18 to become cool before it is ejected back into the reservoir 17. The cooling water that is the first coolant is heated by the heat deprived from the second coolant 15 due to the operation of the heat pump 18 and then ejected from the cooling water discharge port 12.

Note that the temperature of the second coolant 15 in the reservoir 17 can be adjusted by adjusting the flow rate of each of the two second coolant circulation systems including the gas cooler circulation system 21 and the heat pump circulation system 22.

[Advantages]

In the first embodiment illustrated in FIG. 1, the second coolant 15 that is cooled to the exit temperature of the evaporator 18₋₂₀ of the heat pump 18 is stored in the reservoir 17 and then supplied to the cooling tube 13 of the gas cooler 6. Therefore, it is necessary to design the first embodiment in such a way that the temperature of the second coolant supplied to the gas cooler 6 and the exit temperature of the evaporator 18₋₂₀ of the heat pump 18 are substantially equal to each other and the flow rate of the second coolant remains the same.

However, in the case of the second embodiment, it is possible to adjust the flow rate of the second coolant 15 flowing through the gas cooler circulation system 21 to be supplied to the gas cooler 6 and the flow rate of the second coolant 15 flowing through the heat pump circulation system 22 to be supplied to the heat pump 18, independently. Therefore, the design flow rate of each of the devices can be selected freely. Additionally, it is possible to freely select the temperature of the second coolant 15 in the reservoir 17 by adjusting the flow rate of the second coolant 15 flowing through each of the two second coolant circulation systems 21, 22. Thus, as a result, the choice of design conditions of each of the devices is broadened to make it possible to efficiently design the embodiment. Otherwise, this embodiment provides advantages similar to those of the embodiment of FIG. 1.

Third Embodiment

Figure 3:
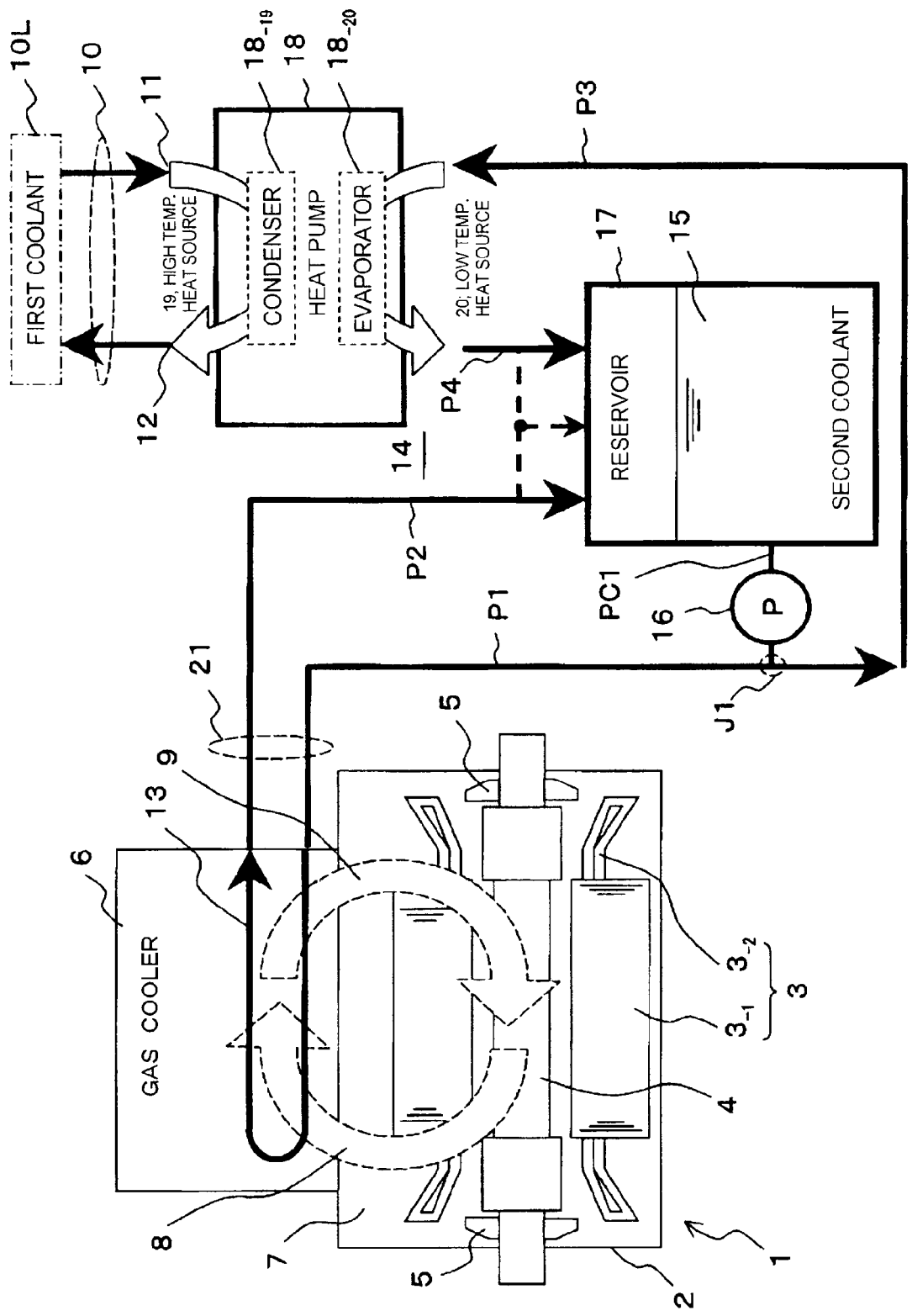
FIG. 3 is a schematic illustration of a third embodiment of a rotary electric machine according to the present invention.

FIG. 3 is a schematic illustration of the third embodiment of a rotary electric machine according to the present invention.

[Configuration]

The third embodiment of the present invention is characterized in that the second coolant circulation system 14 of the second embodiment is partly altered for this embodiment. More specifically, the supply piping P1 of the gas cooler circulation system 21 for circulating the second coolant 15 from the reservoir 17 storing the second coolant 15 to the gas cooler 6 and the supply piping P3 of the heat pump circulation system 22 for circulating the second coolant 15 from the reservoir 17 to the evaporator 18₋₂₀ of the heat pump 18 are connected to a common piping Pc1. The second coolant 15 in the two supply pipings P1 and P3 are pumped out by a common circulation pump 16.

Thus, the circulation pump 16 is inserted in the common piping Pc1 extending from the exit of the reservoir 17 to the junction point J of the supply pipings P1, P3. Otherwise, this embodiment is same as the embodiment of FIG. 2.

The return pipings P2, P4 to the reservoir 17 are formed in separate second coolant circulation systems in the arrangement of FIG. 3. However, the piping P2 and the piping P4 may be merged to form a common return piping as indicated by a broken line in FIG. 3. The ratio of the flow rates of the two second coolant circulation systems can be adjusted by inserting a flow rate control valve to either or each of the two second coolant circulation systems. However, no adjustment mechanism may be required when the diameter and the length of the piping of each of the two second coolant circulation systems are adjusted to obtain a predetermined flow rate ratio in advance.

[Operation]

The operation of this embodiment having the above-described configuration will be described below.

The pressure of the second coolant 15 stored in the reservoir 17 is raised by the circulation pump 16. The supply route of the second coolant 15 is branched into two including the gas cooler circulation system 21 and the heat pump circulation system 22 at the junction point J1. Thus, the second coolant 15 is supplied to both the gas cooler 6 and the evaporator 18₋₂₀ of the heat pump 18, and then circulated back to the reservoir 17 by the return pipings P2, P4 respectively. The cooling effect of the rotary electric machine 1 and the operation of the heat pump 18 are same as those of the second embodiment and hence will not be described here any further.

[Advantages]

Since the second coolant is supplied to the gas cooler circulation system 21 and the heat pump circulation system 22 by means of a single circulation pump 16 in this embodiment, the system of the second coolant circulation system 14 is simplified.

Fourth Embodiment

Figure 4:
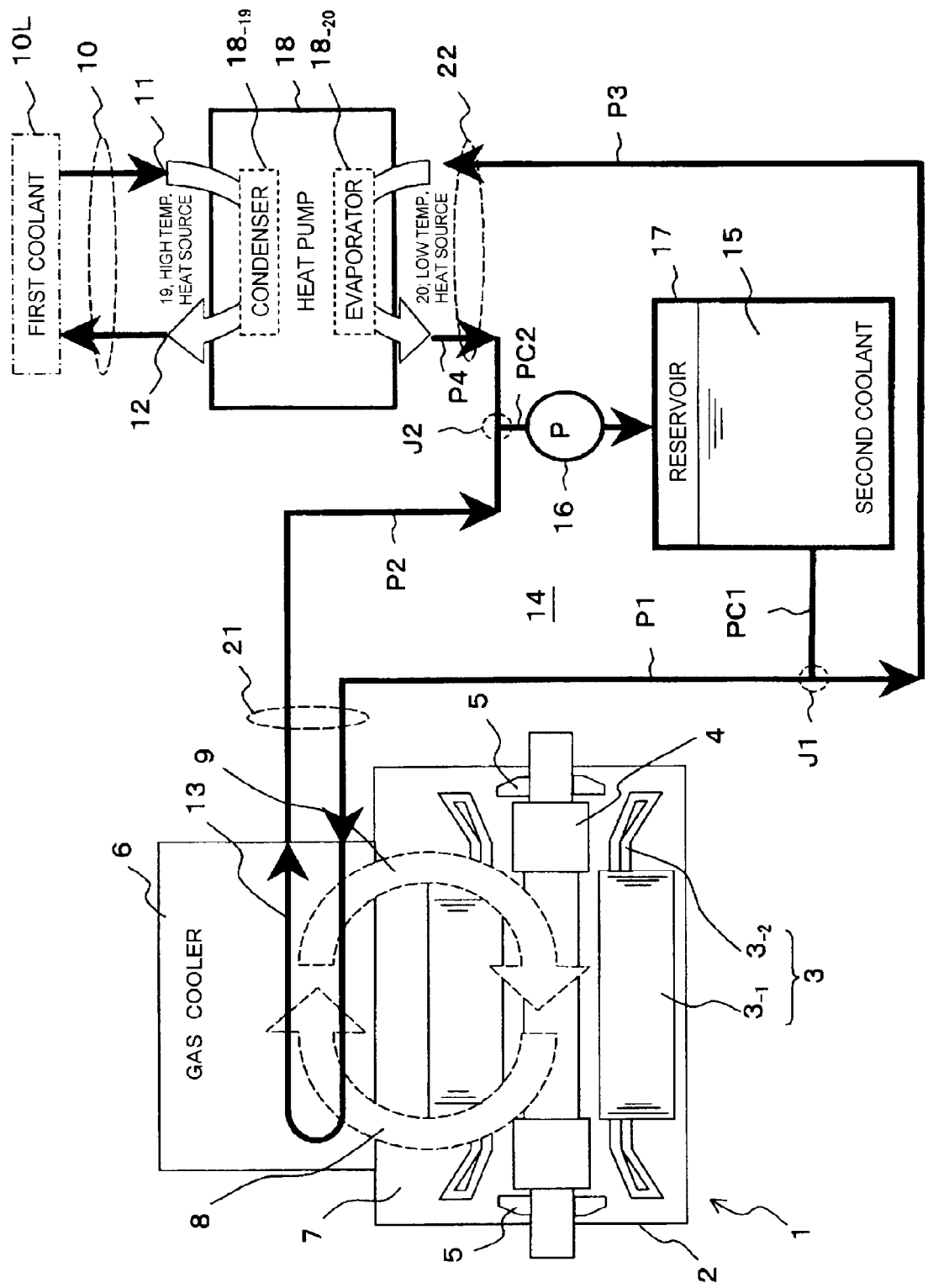
FIG. 4 is a schematic illustration of a fourth embodiment of a rotary electric machine according to the present invention.

FIG. 4 is a schematic illustration of the fourth embodiment of a rotary electric machine according to the present invention.

[Configuration]

The fourth embodiment of the present invention is characterized in that the second coolant circulation system 14 of the third embodiment is partly altered for this embodiment. More specifically, the circulation pump 16 is not arranged on the common piping Pc1 connecting the reservoir 17 and the junction point J1. The return piping P4 connecting the exit of the evaporator $18_{-20}$ of the heat pump 18 of the second cooling heat pump circulation system 22 for circulating the second coolant 15 from the reservoir 17 storing the second coolant 15 to the heat pump 18 and the return piping P2 of the gas cooler circulation system 21 for circulating the second coolant 15 from the gas cooler 6 to the reservoir 17 are merged at junction point J2. A piping PC2 is arranged at the downstream side of the junction point J2 commonly for the two circulation systems and the circulation pump 16 is arranged on the common piping section PC2. Otherwise, this embodiment is same as the embodiment of FIG. 3.

While the exit of the reservoir 17 is connected to the common piping Pc1 in FIG. 4, the supply piping P1 and the supply piping P3 may alternatively be connected separately to the reservoir 17. The ratio of the flow rates of the two second coolant circulation systems 21, 22 can be adjusted by inserting a flow rate control valve to either or each of the two second coolant circulation systems as in the case of the third embodiment. Alternatively, the diameter and the length of the piping of each of the two second coolant circulation systems 21, 22 may be adjusted to obtain a predetermined flow rate ratio in advance. Otherwise, this embodiment is same as the embodiment of FIG. 3.

[Operation]

The operation of this embodiment having the above-described configuration will be described below.

The second coolant 15 stored in the reservoir 17 is pumped out by the operation of the circulation pump 16 arranged on the common return piping Pc2 to the reservoir 17 and supplied to each of the second coolant circulation systems 21, 22. The second coolants 15 discharged from the gas cooler 6 and the evaporator $18_{-20}$ of the heat pump 18 are merged in the common return piping Pc2 and circulated back to the reservoir 17 by way of the circulation pump 16.

[Advantages]

The fourth embodiment provides an advantage that the second coolant can be supplied to both the gas cooler circulation system 21 and the heat pump circulation system 22 for circulating the second coolant to the heat pump by means of the single circulation pump 16 in addition to the advantages of the first embodiment. Thus, it is possible to simplify the second coolant circulation system 14.

Fifth Embodiment

Figure 5:
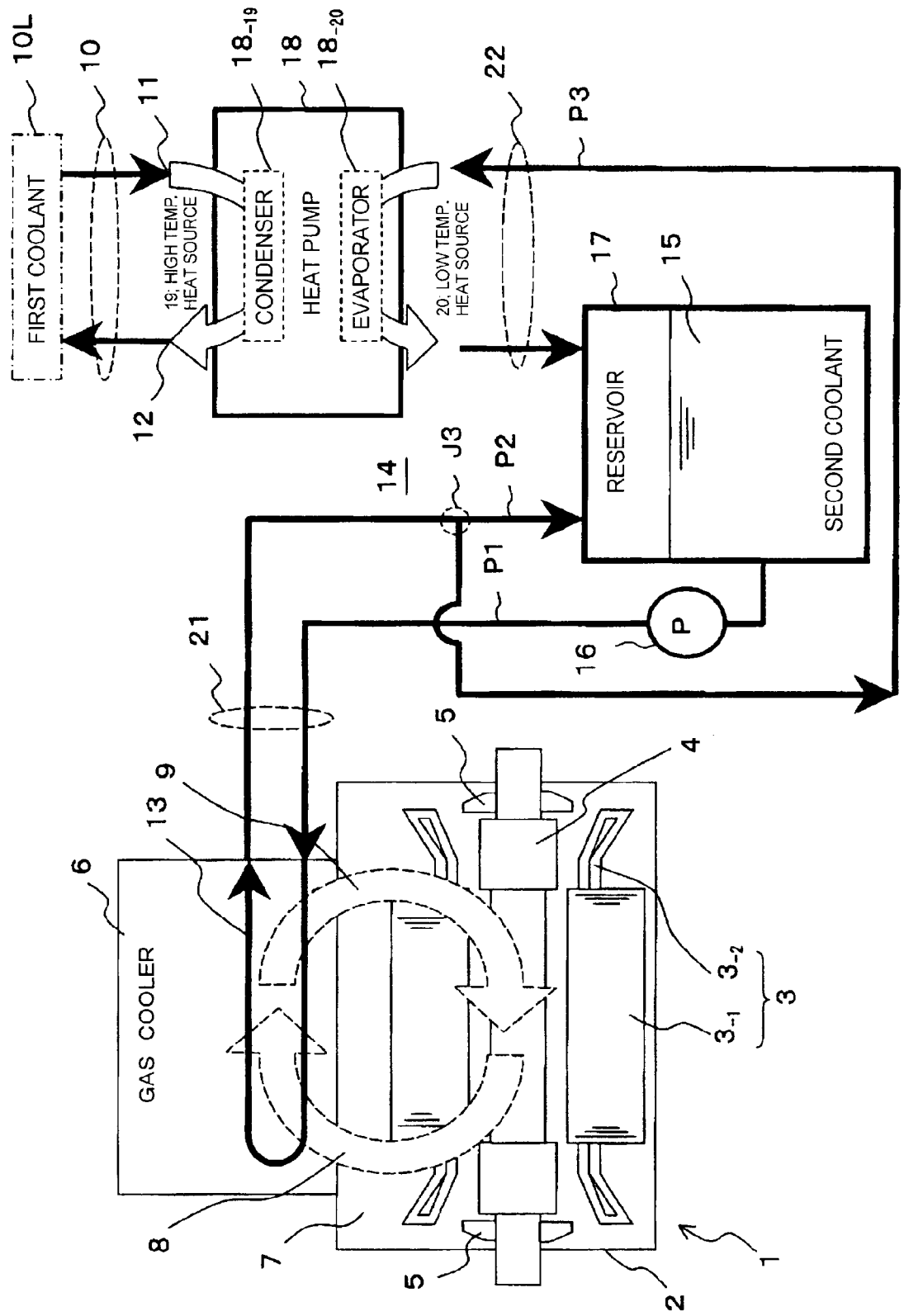
FIG. 5 is a schematic illustration of a fifth embodiment of a rotary electric machine according to the present invention.

FIG. 5 is a schematic illustration of the fifth embodiment of a rotary electric machine according to the present invention.

[Configuration]

The fifth embodiment of the present invention is characterized in that the second coolant circulation system 14 of the first embodiment is partly altered for this embodiment. More specifically, a branch point J3 is arranged at the downstream side of the gas cooler 6 of the gas cooler circulation system 21 for circulating the second coolant 15 from the reservoir 17 storing the second coolant 15 to the gas cooler 6 so as to branch out the heat pump circulation system 22 for circulating the second coolant to the heat pump 18. A common piping is used for the two circulation systems at the upstream side of the branch point J3, and the circulation pump 16 for circulating the second coolant is arranged on the common piping section.

The circulation pump 16 is arranged on the common piping P1 connecting the exit of the reservoir 17 to the gas cooler 6 in FIG. 5. However, the return pipings to the reservoir may be merged to a common return piping as shown in FIG. 4, and the circulation pump 16 may be arranged on the return piping. The ratio of the flow rates of the two second coolant circulation systems 21, 22 can be adjusted by inserting a flow rate control valve to either or each of the two second coolant circulation systems. However, adjustment mechanism may not be required when the diameter and the length of the piping of each of the two second coolant circulation systems are adjusted to obtain a predetermined flow rate in advance. Otherwise, this embodiment is same as the embodiments of FIGS. 3 and 4.

[Operation]

The operation of this embodiment having the above-described configuration will be described below.

The pressure of the second coolant 15 stored in the reservoir 17 is raised by the circulation pump 16 and then the second coolant 15 stored in the reservoir 17 is supplied to the cooler 6 by way of the gas supply piping P1. The second coolant 15 exchanges heat with the cooling gas 7 in the rotary electric machine 1 at the gas cooler 6. Subsequently the discharged second coolant 15 is divided into the two routes including the gas cooler circulation system 21 and the heat pump circulation system 22 at the branch point J3. The second coolant 15 branched to the heat pump circulation system 22 flows further to the evaporator $18_{-20}$ of the heat pump 18 and deprived of heat there to become cooler before it is circulated back to the reservoir 17.

[Advantages]

Since all the circulating second coolant 15 passes through the gas cooler 6 in this embodiment, it can efficiently exchange heat with the cooling gas in the rotary electric machine 1 as in the case of the first embodiment. On the other hand, the flow rate of the second coolant circulating to the heat pump 18 can be adjusted to the lowest necessary level so that the heat pump can be operated efficiently.

Sixth Embodiment

Figure 6:
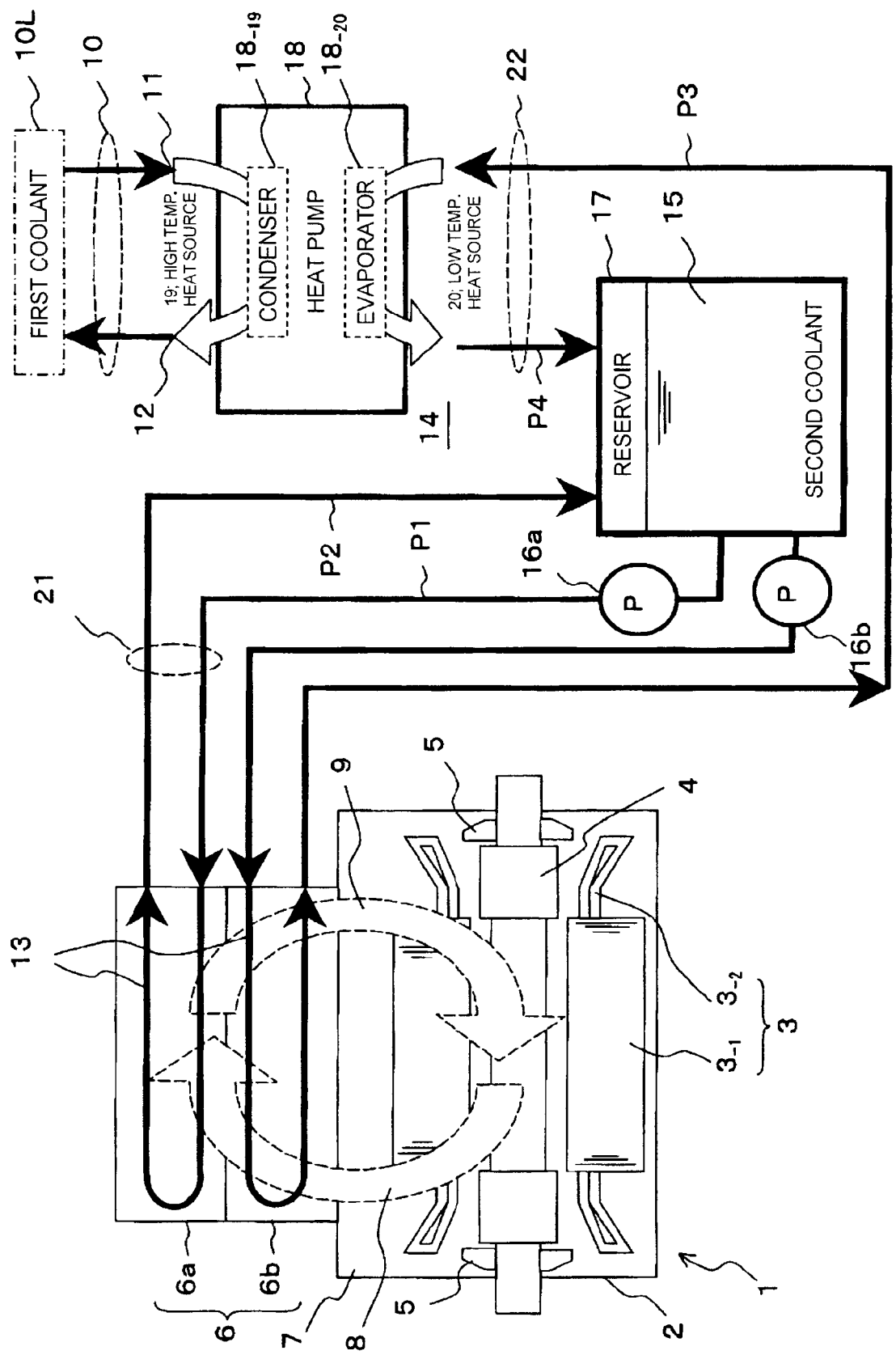
FIG. 6 is a schematic illustration of a sixth embodiment of a rotary electric machine according to the present invention.

FIG. 6 is a schematic illustration of the sixth embodiment of a rotary electric machine according to the present invention.

[Configuration]

The sixth embodiment of the present invention is characterized in that the gas cooler 6 and the second coolant circulation system 14 of the first embodiment are partly altered for this embodiment.

More specifically, referring to FIG. 6, the gas cooler 6 of the rotary electric machine 1 is divided into two gas coolers 6a and 6b. The second coolant 15 of the gas cooler circulation system 21 that circulates from the reservoir 17 is supplied to one of the gas coolers, or the gas cooler 6a. On the other hand, the second coolant 15 of the heat pump circulation system 22 that circulates to the heat pump 18 is supplied to the other gas cooler 6b. In FIG. 6, reference numerals "16a" and "16b" are circulation pumps that are arranged respectively on the gas cooler circulation system 21 and the heat pump circulation system 22 and that can be operated independently.

Figure 7:
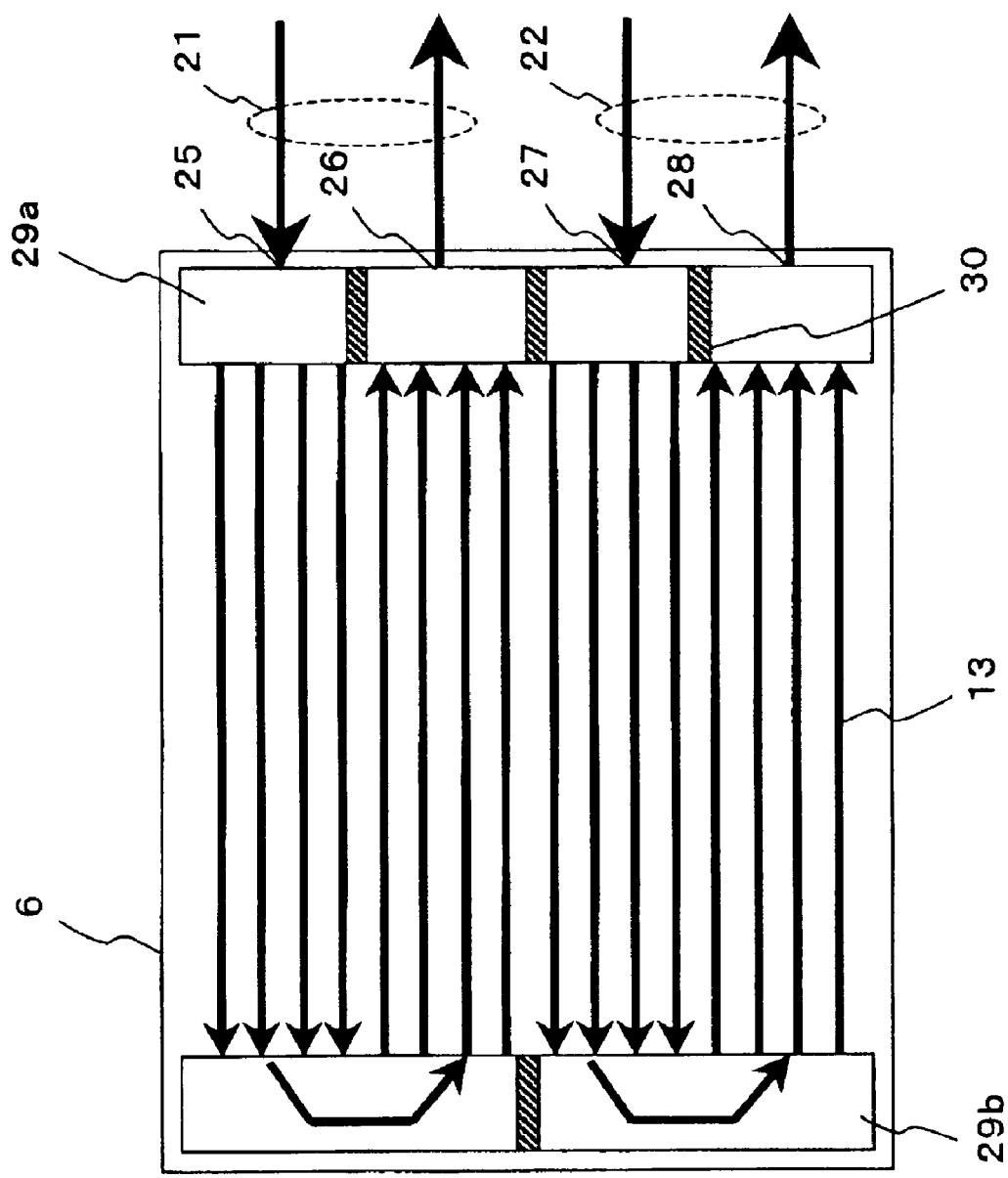
FIG. 7 is a schematic illustration of a gas cooler.

As shown in FIG. 7, the flow route of coolant in an ordinary gas cooler is such that the water chambers 29a, 29b at the opposite ends of the gas cooler are linked to each other by cooling tubes 13, each of the water chambers 29a, 29b are divided by partitions 30 to form a flow route of coolant. In FIG. 7, reference numerals 25 and 27 denote the entrances of the second coolant 15 and reference numerals 26 and 28 denote the exits of the second coolant 15.

While the gas cooler is divided into two gas coolers in FIG. 6, it may alternatively be divided into three or more than three gas coolers. While the second coolant gas cooler circulation system 21 and the second coolant heat pump circulation system 22 are arranged as independent routes in FIG. 6, they may partly be turned to a common route as shown in FIGS. 3 and 4. While a plurality of gas coolers are arranged in FIG. 6, the flow route of a gas cooler may be divided into two or more than two routes in a common cabinet as shown in FIG. 7. Otherwise, this embodiment is same as the embodiments of FIGS. 2 through 4.

[Operation]

The operation of this embodiment having the above-described configuration will be described below.

The second coolants 15 supplied respectively to the second coolant gas cooler circulation system 21 and the second coolant heat pump circulation system 22 by the circulation pumps 16a, 16b exchange heat with the cooling gas 7 in the rotary electric machine 1, passing through the cooling tubes 13 of the gas coolers 6a, 6b.

[Advantages]

Since all the circulating second coolant 15 passes through the gas cooler 6 in this embodiment, it can efficiently exchange heat with the cooling gas in the rotary electric machine 1. Additionally, since the gas coolers are independently and respectively arranged in the second coolant gas cooler circulation system 21 and the second coolant heat pump circulation system 22, it is possible to design the rotary electric machine according to the two flow rates of the second coolant and the temperature conditions to allow the second coolant to efficiently exchange heat with the gas cooler 7 in the rotary electric machine.

Seventh Embodiment

Figure 8:
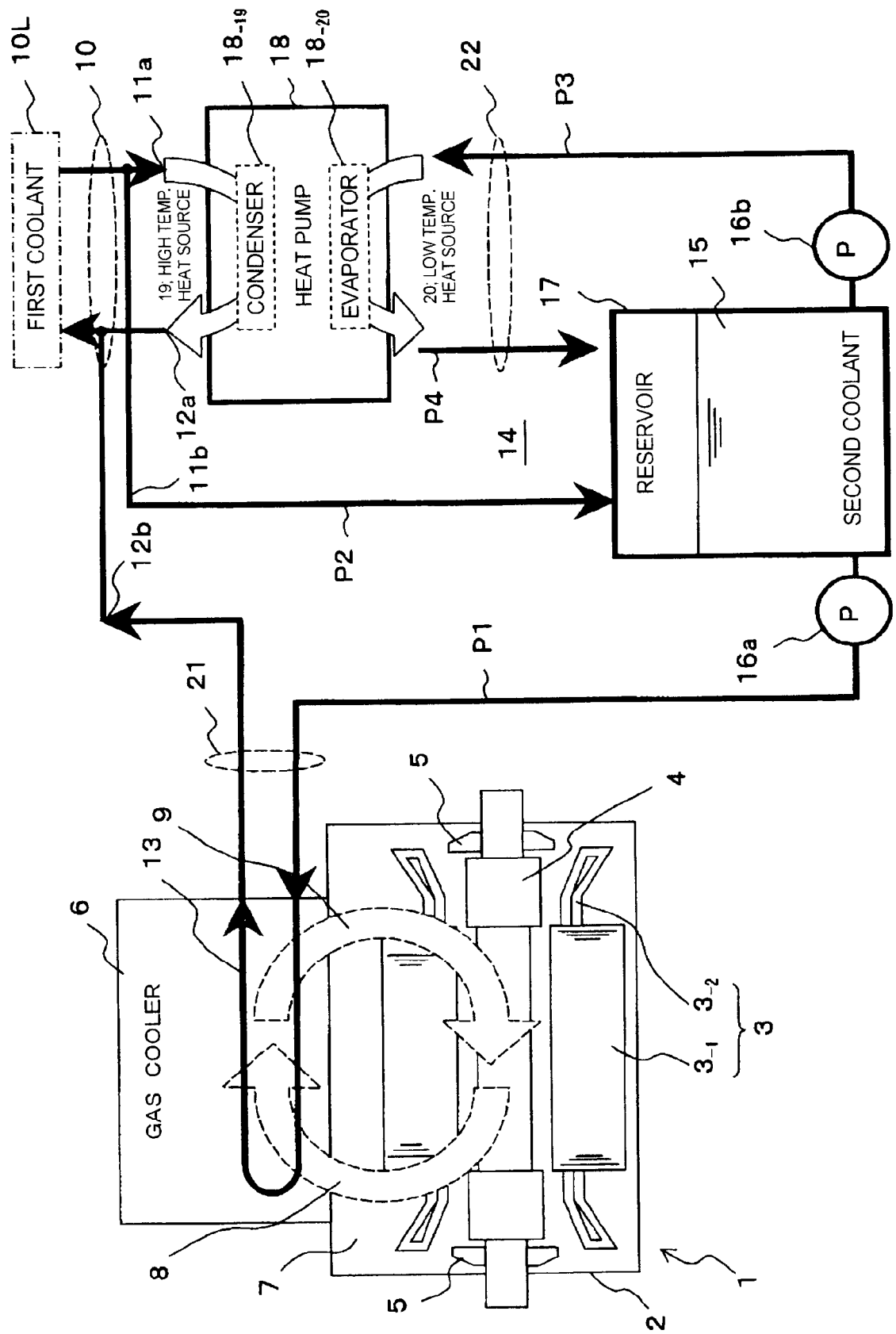
FIG. 8 is a schematic illustration of a seventh embodiment of a rotary electric machine according to the present invention.

FIG. 8 is a schematic illustration of the seventh embodiment of a rotary electric machine according to the present invention.

[Configuration]

In the seventh embodiment of the present invention, a liquid coolant same as that of the first coolant 10L is used for the second coolant 15 and the gas cooler circulation system 21 is lined to the first coolant system 10 at the supply port 11b and the discharge port 12b. Otherwise, this embodiment is same as those of FIGS. 2, 3, 5 and 6.

While the circulation pump 16a is arranged on the gas cooler circulation system 21 in FIG. 8, the circulation pump 16a can be omitted when the first coolant system 10 is provided with a circulation pump.

[Operation]

The operation of this embodiment having the above-described configuration will be described below.

With the arrangement of FIG. 8, the first coolant 10L supplied from the first coolant system supply port 11b and the second coolant 15 flowing through the heat pump circulation system 22 are mixed in the reservoir 17.

In the second coolant gas cooler circulation system 21, the pressure of the second coolant 15 is raised by the circulation pump 16a. Then, the second coolant 15 is supplied to the gas cooler 6, where it exchanges heat with the high temperature cooling gas 7 in the gas cooler 6, and substantially discharged into the first coolant system 10 from the first coolant system discharge port 12b.

On the other hand, in the heat pump circulation system 22, the pressure of the second coolant 15 is raised by the circulation pump 16b. Then, the second coolant 15 enters the evaporator $18_{-20}$ of the heat pump 18 and is deprived of heat there due to the operation of the heat pump 18 to become cooler and ejected into the reservoir 17. Otherwise, the operation of this embodiment is same as that of the embodiments of FIGS. 2, 3, 5 and 6.

[Advantages]

In this embodiment, the first coolant is supplied from the first coolant system 10 to the reservoir 17 and mixed with the second coolant. Therefore, it is possible to adjust the temperature of the second coolant 15 in the reservoir between the exit temperature of the evaporator $18_{-20}$ of the heat pump 18 and the supply temperature of the first coolant. Thus, the choice of design conditions of the gas cooler 6 and that of the heat pump 18 are broadened to make the design more efficient.

Additionally, the second coolant 15 that has exchanged heat in the gas cooler 6 with the cooling gas 7 in the rotary electric machine 1 is discharged to the first coolant system 10. Therefore, it is not necessary to make the quantity of heat exchange of the second coolant in the gas cooler 6 and that of the second coolant in the heat pump 18 match each other. In other words, each of the devices can be designed freely to raise the efficiency of the overall operation of the rotary electric machine 1.

Additionally, the cooling gas of the rotary electric machine 1 is cooled by the first coolant system 10 for part of the quantity of heat exchange, it is possible to design the heat pump 18 with a small quantity of heat exchange and hence downsize the entire system.

The output power of a rotary electric machine frequently fluctuates depending on the operating conditions thereof. On the other hand, the cooling conditions of the cooling gas in the rotary electric machine such as the flow rate are determined according to the rated operating conditions, and cooling gas is made to flow at a constant rate regardless of the output power of the rotary electric machine. Thus, the efficiency of operation of the rotary electric machine decreases when the load thereof is lower than the rated load.

With the arrangement illustrated in FIG. 8, it is possible to circulate the coolant to the second coolant gas cooler circulation system 21 in order to cool the gas cooler 6 of the rotary electric machine 1 only by means of the first coolant 10L supplied from the first coolant system 10 without operating the heat pump in a low output power region. Thus, the efficiency of the rotary electric machine is improved when it is operated with a partial load.

Additionally, it is possible to control the temperature of the coolant being supplied to the gas cooler 6 by adjusting the rate at which the coolant is supplied from the first coolant system 10 and the rate at which the coolant circulates in the heat pump circulation system 22. Therefore, it is possible to alleviate the thermal stress generated due to the difference of thermal expansions by adjusting the temperature of the coolant being supplied. The temperature changes significantly when the rotary electric machine is operated under certain conditions such as during a start-up operation of the rotary electric machine. Then, it is possible to improve the reliability of the rotary electric machine. Otherwise, this embodiment provides advantages similar to those of the embodiment of FIGS. 2, 3, 5 and 6.

Eighth Embodiment

Figure 9:
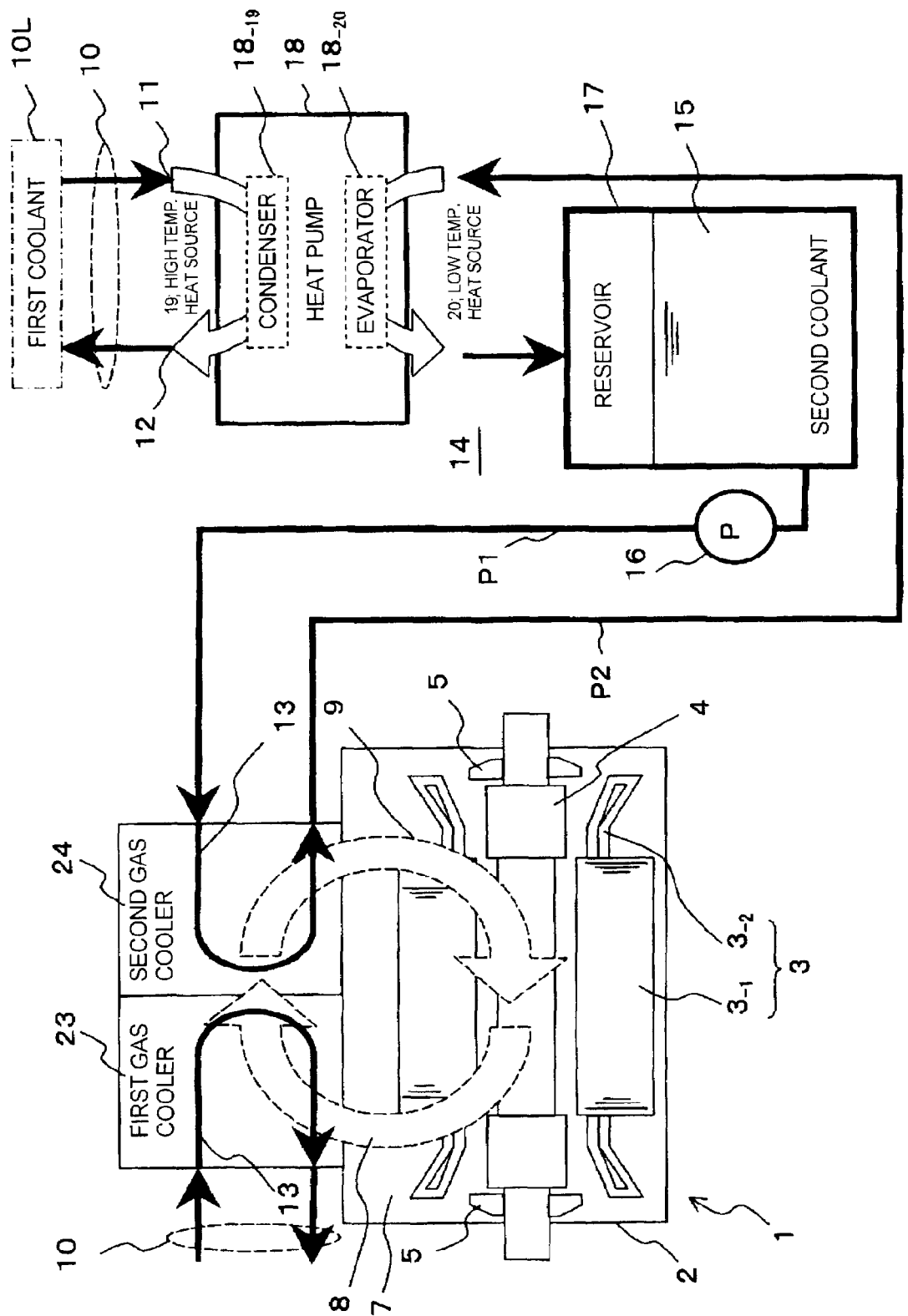
FIG. 9 is a schematic illustration of an eighth embodiment of a rotary electric machine according to the present invention.

FIG. 9 is a schematic illustration of the eighth embodiment of a rotary electric machine according to the present invention.

[Configuration]

The eighth embodiment of the present invention is characterized in that the gas cooler and its coolant circulation system of the above-described first embodiment (FIG. 1) are partly altered for this embodiment. More specifically, the gas cooler 6 of the rotary electric machine 1 is divided into two or more than two gas coolers. Then, at least one of the gas coolers is used as the first gas cooler 23 for supplying the first coolant from the first coolant system 10 and the other gas cooler is or the other gas coolers are used as the second gas cooler 24 for supplying the second coolant by means of the second coolant circulation system having a configuration as illustrated in one of FIGS. 1 through 8. Otherwise, this embodiment is same as the embodiment of FIG. 1.

When the gas cooler 6 of the rotary electric machine is formed by a plurality of units of coolers, it is not necessary to divide the gas cooler. Some of the existing gas cooler units may be assigned to the first gas cooler 23 to be cooled by the first coolant, and the other existing gas cooling units to the second gas cooler 24 to be cooled by the second coolant. Furthermore, it is not necessary to divide the gas cooler itself when the inside of the gas cooler 6 is divided into a plurality of flow routes as shown in FIG. 7. Otherwise, this embodiment is same as the embodiments of FIGS. 1 through 8.

[Operation]

The operation of this embodiment having the above-described configuration will be described below.

With the arrangement of FIG. 9, of the cooling gas 7 in the rotary electric machine 1, the warmer part thereof that passes through the first gas cooler 23 exchanges heat with the first coolant and subsequently with the second gas cooler 24 to become cooler cooling gas 7, and then, returns to the side of the stator 3 and the rotor 4. Otherwise, the operation of this embodiment is same as that of the embodiments of FIGS. 1 through 8.

[Advantages]

The cooling gas in the rotary electric machine 1 of this embodiment is cooled by the first coolant and the second coolant 15, and the cooling gas of the rotary electric machine 1 is cooled by the first coolant system 10 for part of the exchanged heat. Thus, it is possible to design the quantity of exchanged heat of the heat pump 18 to be small and hence downsize the system. Otherwise, this embodiment provides advantages similar to those of the embodiments of FIGS. 1 through 8.

Ninth Embodiment

Figure 10:
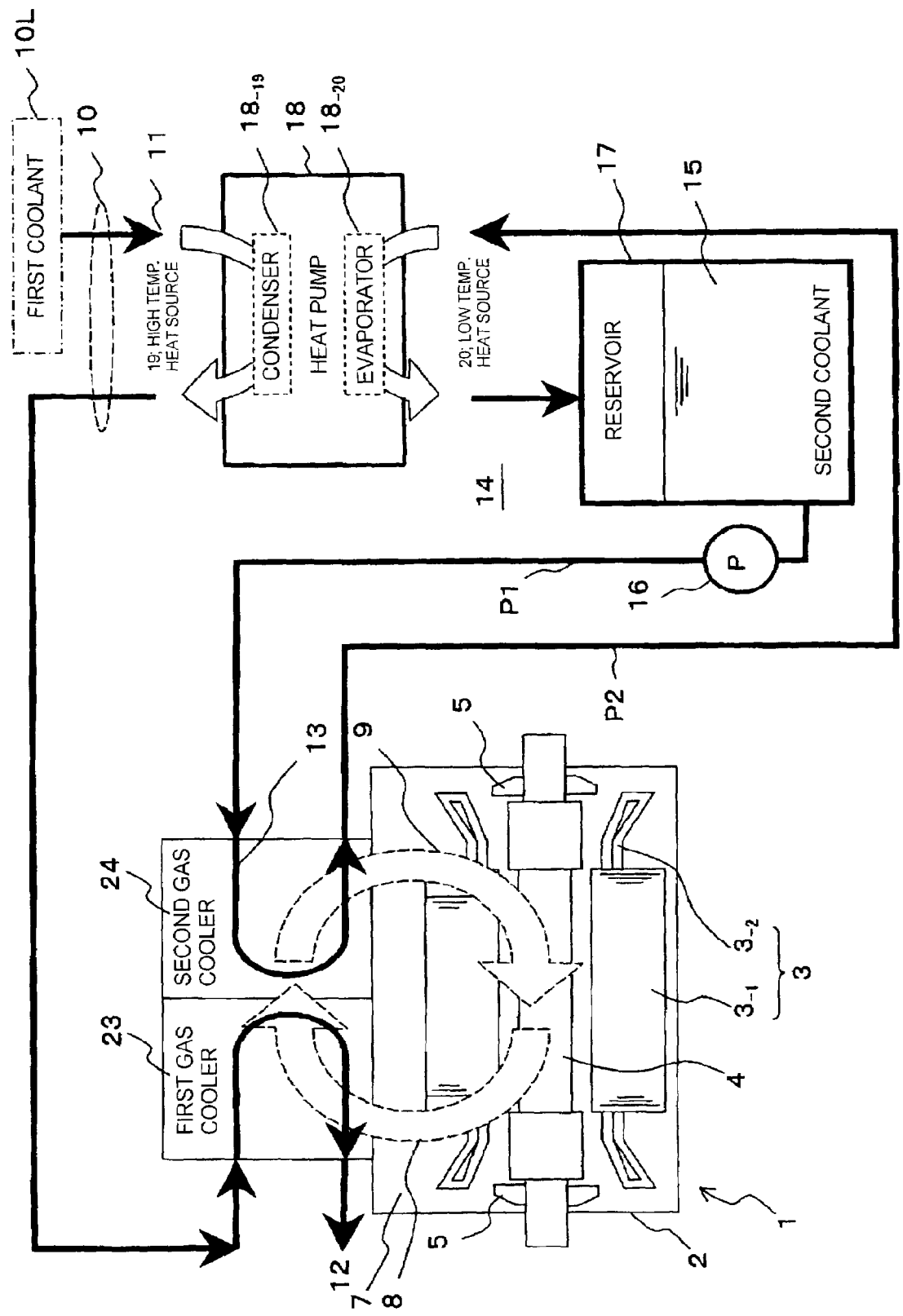
FIG. 10 is a schematic illustration of a ninth embodiment of a rotary electric machine according to the present invention.

FIG. 10 is a schematic illustration of the ninth embodiment of a rotary electric machine according to the present invention.

[Configuration]

The ninth embodiment of the present invention is characterized in that the coolant circulation system of the above-described eighth embodiment is partly altered for this embodiment. More specifically, the first gas cooler 23 for supplying the first coolant 10L from the first coolant system 10 of the rotary electric machine 1 is connected in series to the first coolant system 10 that is linked to the condenser $18_{-19}$ of the heat pump 18. Otherwise, this embodiment is same as that of FIG. 8.

While only a single first gas cooler 23 is shown in FIG. 10, the rotary electric machine 1 may alternatively be made to comprise a plurality of first gas coolers 23. Then, the first gas coolers 23 may be connected in series or in parallel. Additionally, while the heat pump 18 is arranged at the upstream side of the first gas cooler 23 in FIG. 10, it may alternatively be arranged at the downstream side of the first gas cooler 23.

[Operation]

The operation of this embodiment having the above-described configuration will be described below.

With the arrangement of FIG. 10, the first coolant is supplied from the first liquid coolant system supply port 11 to the condenser $18_{-19}$ of the heat pump 18 and exchanges heat with the second coolant 15 supplied to the evaporator $18_{-20}$. Then, the first coolant is ejected from the heat pump. Furthermore, the first coolant passes through the piping connected to the first gas cooler 23 in series and exchanges heat with the cooling gas in the rotary electric machine 1 at the first gas cooler 23. Then, the first coolant is discharged to the first coolant system 10 from the first liquid coolant discharge port 12. Otherwise, the operation of this embodiment is same as that of the embodiment of FIG. 8.

[Advantages]

The first coolant supplied to the condenser $18_{-19}$ of the heat pump 18 and the first coolant supplied to the first gas cooler 23 are made to flow in series in this embodiment. Therefore, it is possible to design the necessary flow rate of the first coolant system to a low level. Additionally, the cooling gas 7 in the rotary electric machine 1 is cooled by the first coolant 10L and the second coolant 15, and the gas cooler 7 of the rotary electric machine 1 is cooled by the first coolant system 10 for part of the exchanged heat. Therefore, it is possible to design the quantity of exchanged heat of the heat pump 18 to be small and hence downsize the system. Otherwise, this embodiment provides advantages similar to those of the embodiments of FIGS. 1 through 8.

Tenth Embodiment

Figure 11:
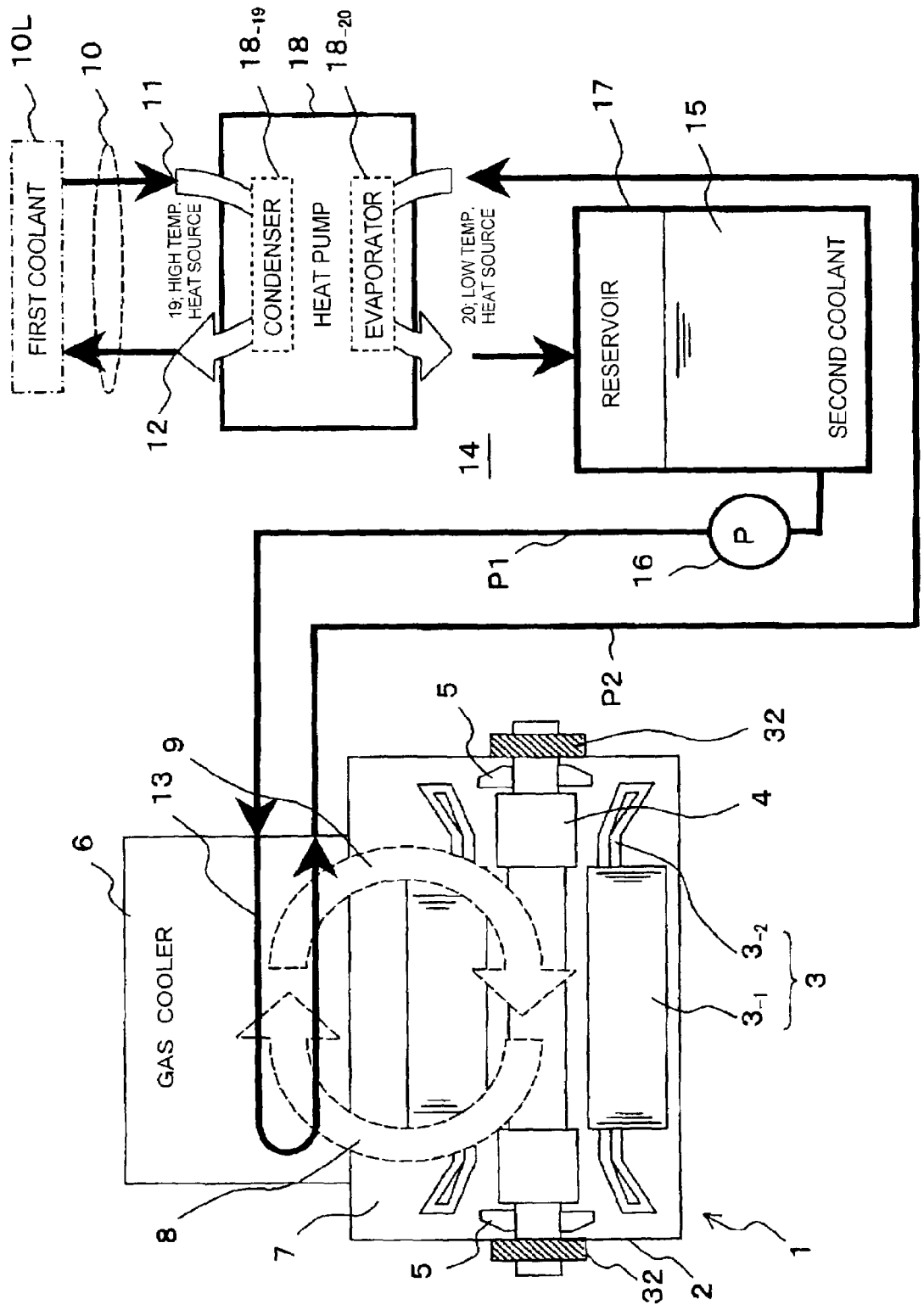
FIG. 11 is a schematic illustration of a tenth embodiment of a rotary electric machine according to the present invention.

FIG. 11 is a schematic illustration of the tenth embodiment of a rotary electric machine according to the present invention.

[Configuration]

The tenth embodiment of the present invention is characterized in that air is used for the cooling gas 7 of the rotary electric machine 1.

In a typical air-cooled type rotary electric machine, the openings at the end sections of the rotor shaft of the rotary electric machine is not sealed. Then, the pressure level of the inlets of the rotor fans 5 arranged at the ends of the shaft of the rotor 4 is lower than the level of the atmospheric pressure outside the rotary electric machine. Therefore, it is inevitable that outside air is taken into the rotary electric machine from the openings at the end sections of the rotor shaft of the rotary electric machine. The place where the temperature of cooling gas is the lowest in the rotary electric machine is the gas cooler 6. Practically no problem arises so long as the temperature of the cooling fins of the gas cooler 6 is higher than outside air. However, the problem of dew condensation can arise at the cooling fins of the gas cooler 6 when the temperature of the cooling fins is lower than that of the outside air.

When dew condensation takes place on the cooling fins of the gas cooler, not only rust appears on the gas cooler but also the water drops spun away by cooling gas may adhere to the stator 3 and the rotor 4 to accelerate the degradation of the insulation. Then, the reliability of the rotary electric machine falls.

In view of such a possible problem, dehumidifiers 32 are arranged respectively at the opposite end sections of the rotor shaft outside of the closed type frame 2 of the rotary electric machine 1 as shown in FIG. 11 to remove the moisture of outside air that can be sucked into the machine. Otherwise, this embodiment is basically same as that of FIG. 1.

[Operation]

The operation of this embodiment having the above-described configuration will be described below.

When the pressure of the inlets of the rotor fans 5 arranged at the ends of the shaft of the rotor 4 becomes lower than the atmospheric pressure outside the rotary electric machine, the outside air is taken into the rotary electric machine from the openings at the end sections of the rotor shaft of the rotary electric machine. The outside air flows into the machine after passing the dehumidifiers 32, so that moisture is removed from the outside air that is flowing into the machine. Otherwise, the operation of this embodiment is same as that of the embodiments of FIGS. 1 through 10.

[Advantages]

Moisture is removed from the outside air that is taken into the rotary electric machine from the openings at the end sections of the rotor shaft of the machine before the outside air flows into the machine by means of the dehumidifiers 32. Therefore, there is less possibility for dew condensation to take place on the cooling fins of the gas cooler 6, so that the reliability of the rotary electric machine is improved. Otherwise, this embodiment provides advantages similar to those of the embodiments of FIGS. 1 through 10.

Eleventh Embodiment

Figure 12:
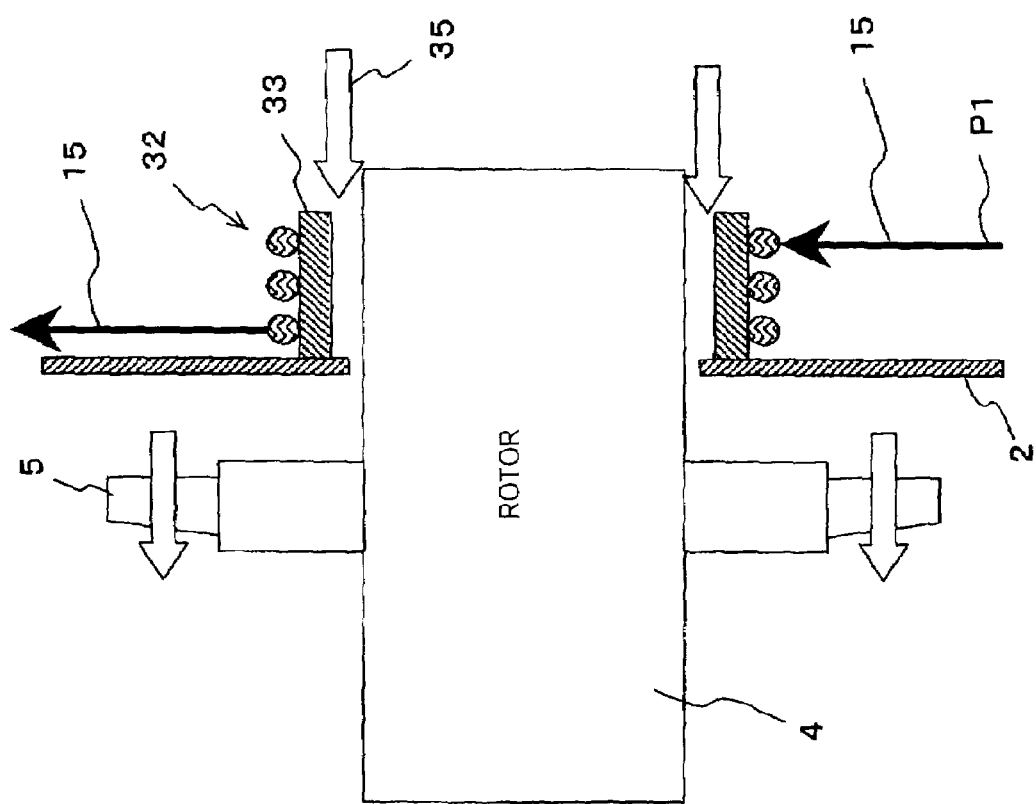
FIG. 12 is a schematic illustration of an eleventh embodiment of a rotary electric machine according to the present invention.

FIG. 12 is a schematic illustration of the eleventh embodiment of a rotary electric machine according to the present invention.

[Configuration]

The eleventh embodiment of the present invention is characterized by being related to the heat source to be used for the dehumidifiers of the above-described tenth embodiment. In this eleventh embodiment, cylindrical thermally conductive plates 33 are arranged at the parts where the end sections of the rotor shaft penetrate the closed type frame. The supply piping P1 is wound around the thermally conductive plates 33 for the dehumidifiers. Otherwise, this embodiment is same as that of FIG. 11.

[Operation]

The operation of this embodiment having the above-described configuration will be described below.

In FIG. 12, the thermally conductive plates 33 are cooled by the second coolant 15 flowing in the supply piping P1 and held to a temperature lower than the temperature of outside air in the rotary electric machine 1. Since outside air is brought into contact with the thermally conductive plates 33 before it enters the rotary electric machine 1, the moisture contained in outside air is condensed to become dew drops on the thermally conductive plates. Thus, it is possible to remove moisture that otherwise flows into the machine.

It is desirable that the temperature of the second coolant supplied to the thermally conductive plates 33 is lower than the dew point temperature of outside air. However, so long as the temperature of the second coolant supplied to the thermally conductive plates is made lower than the temperature of the second coolant supplied to the gas cooler 6, the internal temperature of the rotary electric machine would not be lower than the temperature of the thermally conductive plates and dew condensation would scarcely take place on the gas cooler 6. Otherwise, the operation of this embodiment is same as that of the embodiment of FIG. 11.

[Advantages]

The second coolant 15 obtained by the second coolant circulation system 14 is supplied to the low temperature heat source to be used for the dehumidifiers 32 in this embodiment. Therefore, it is possible to dehumidify the outside air taken into the rotary electric machine without requiring any particular cooling device.

Twelfth Embodiment

Figure 13:
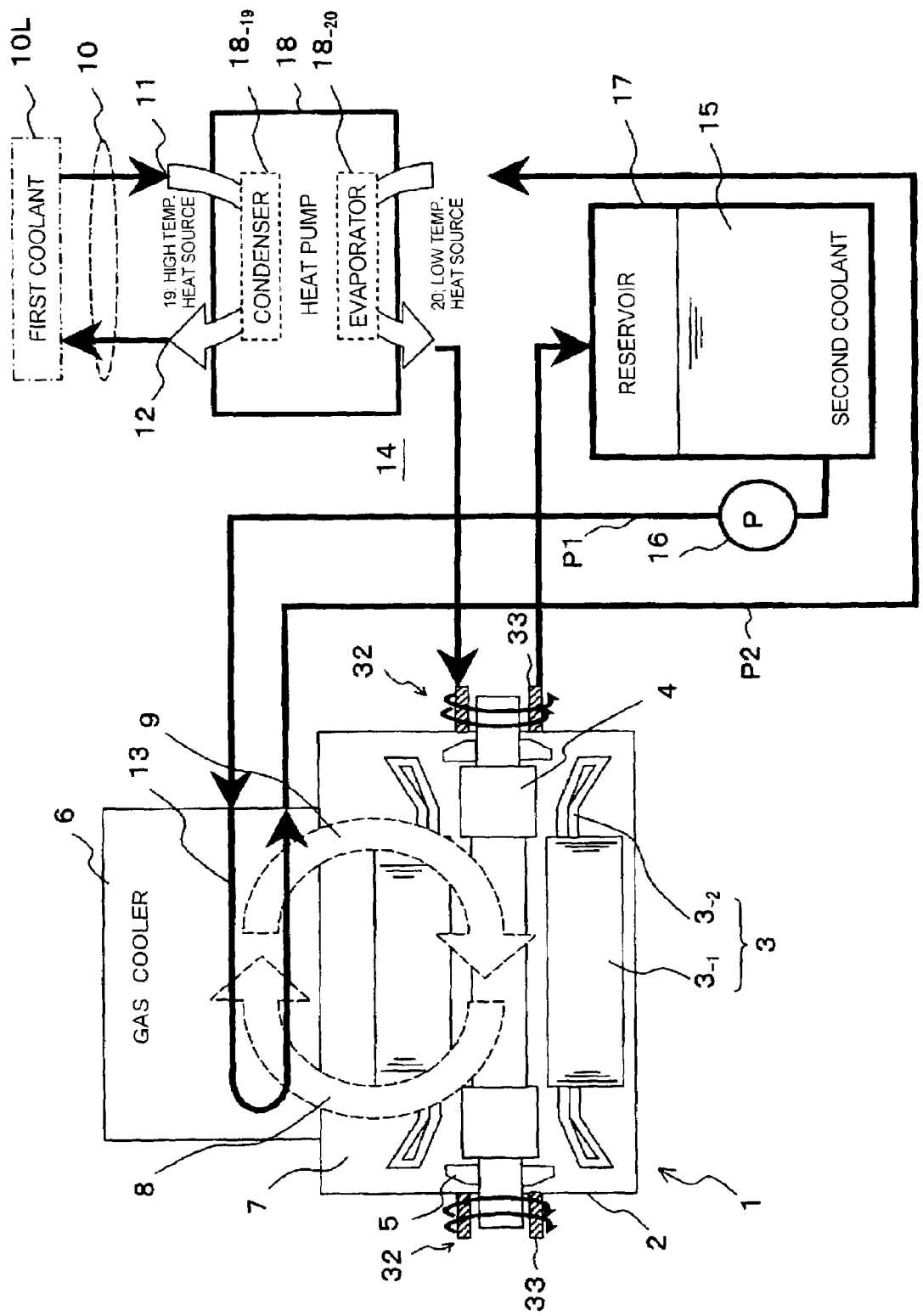
FIG. 13 is a schematic illustration of a twelfth embodiment of a rotary electric machine according to the present invention.

FIG. 13 is a schematic illustration of the twelfth embodiment of a rotary electric machine according to the present invention.

[Configuration]

The twelfth embodiment of the present invention is characterized in that the cool second coolant coming out from the exit of the evaporator $18_{-20}$ of the heat pump 18 is used as the second coolant 15 to be supplied to the dehumidifiers 32 of FIG. 13. Otherwise, this embodiment is same as that of FIG. 12.

[Operation]

The operation of this embodiment having the above-described configuration will be described below.

The second coolant that shows the lowest temperature at the exit of the evaporator of the heat pump 18 is supplied to the dehumidifiers 32. Otherwise, the operation of this embodiment is same as that of the embodiment of FIG. 12.

[Advantages]

With this twelfth embodiment, it is possible to remove moisture from the outside air taken into the rotary electric machine 1 most efficiently because the second coolant 15 is supplied to the dehumidifiers 32 from the site where the temperature is lowest in the second coolant circulation system 14. Otherwise, this embodiment provides advantages similar to those of the embodiment of FIG. 12.

Thirteenth Embodiment

Figure 14:
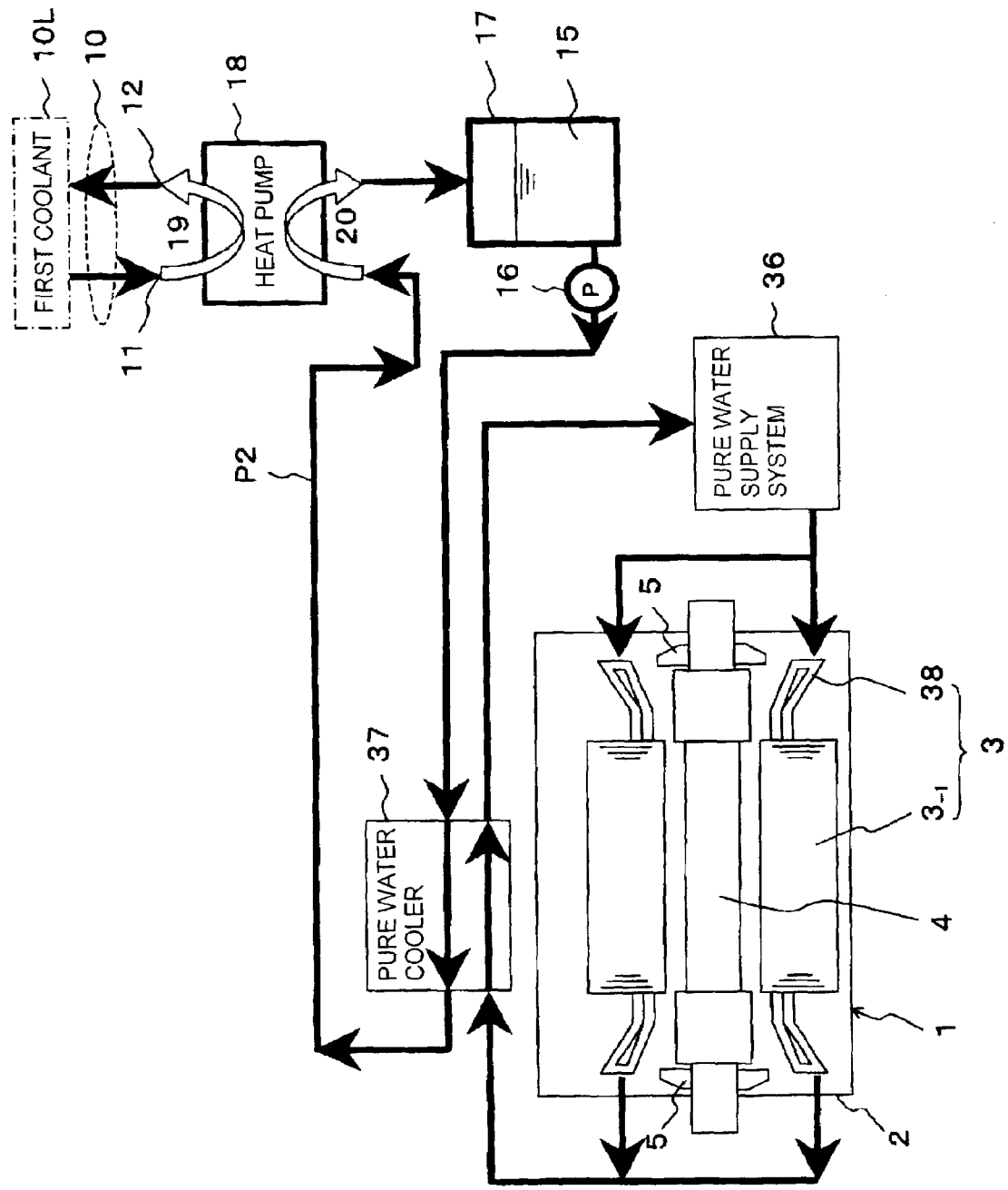
FIG. 14 is a schematic illustration of a thirteenth embodiment of a rotary electric machine according to the present invention.

FIG. 14 is a schematic illustration of the thirteenth embodiment of a rotary electric machine according to the present invention.

[Configuration]

The thirteenth embodiment of the present invention is characterized in that pure water is made to flow through the hollow stator coil 38 so as to directly cool it in the rotary electric machine of this embodiment.

Referring to FIG. 14, the pure water to be used for cooling the stator coil 38 is produced by and stored in a pure water supply system 36. As described earlier by referring to the conventional art, the pure water supply system 36 comprises a tank for storing pure water, a pure water producing apparatus and a pump. However, the pure water supply system 36 is shown in a simplified manner in FIG. 14.

The pure water that is pressurized by a pump (not shown) is supplied to the water-cooled stator coil 38 in the rotary electric machine 1 by way of a collecting tube such as one of the headers from the pure water supply system 36. The pure water flows axially through the water-cooled stator coil 38 to directly cool the water-cooled stator coil 38. The pure water, whose temperature is raised as a result of cooling the water-cooled stator coil 38, is collected in a collecting tube such as one of the headers. Then, the pure water is taken out from the rotary electric machine 1. Then, it exchanges heat with the first coolant 10L by means of a pure water cooler 37, and it is cooled. Then, the pure water circulates to the pure water supply system 36.

This embodiment additionally comprises a second coolant circulation system 14 that uses the second coolant 15 as cooling medium and is different from the first coolant system 10. This embodiment further comprises the heat pump 18 (or a freezer) which is described above. The obtained low temperature second coolant 15 is supplied to the pure water cooler 37 to cool the pure water there.

This embodiment may be combined with the cooling system of any of the above-described first through twelfth embodiments where the second coolant 15 is supplied to the gas cooler.

[Operation]

The operation of this embodiment having the above-described configuration will be described below.

With the arrangement of FIG. 14, the pressure of the second coolant 15 stored in the reservoir 17 is raised by the circulation pump 16, and the second coolant 15 is supplied to the pure water cooler 37. The second coolant 15 that has exchanged heat in the pure water cooler 37 with the pure water whose temperature was raised as a result of cooling the water-cooled stator coil 38 enters the evaporator $18_{-20}$ of the heat pump 18. The second coolant is deprived of heat there due to the operation of the heat pump 18 to become cooler once again. Then, the cooled second coolant 15 is ejected into the reservoir 17. In the heat pump 18, the gas that has heated in the condenser $18_{-19}$ exchanges heat with the first coolant supplied from the first coolant supply port 11 to become warmer and emits condensation heat. The heated first coolant is then ejected into the first coolant system 10.

[Advantages]

With a cooling apparatus of the rotary electric machine of the thirteenth embodiment, the first coolant system 10 and the second coolant circulation system 14 are introduced respectively to the side of the condenser $18_{-19}$ and that of the evaporator and the heat pump 18 is operated. As a result, it is possible to cool the second coolant to a temperature lower than that of the first coolant if compared with the conventional art where the first coolant is used as the liquid coolant of the pure water cooler 37. Then it is possible to obtain lower temperature pure water by supplying the low temperature second coolant to the pure water cooler 3. Thus, the effect of cooling the components such as the water-cooled stator coil 38 can be enhanced without changing the design and the structure of the main body of the rotary electric machine 1. Otherwise, this embodiment provides advantages similar to those of the embodiment of FIG. 1.

Fourteenth Embodiment

Figure 15:
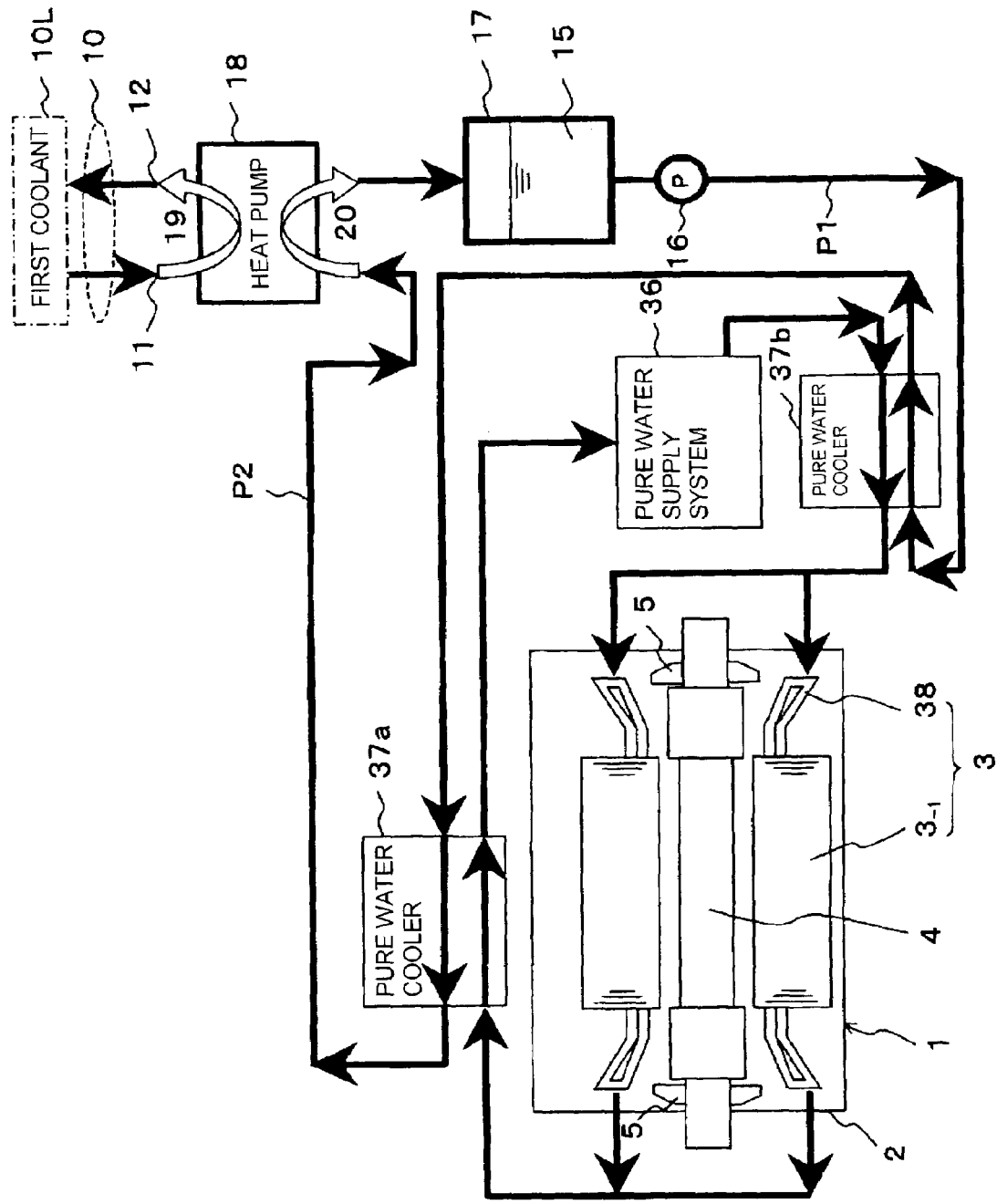
FIG. 15 is a schematic illustration of a fourteenth embodiment of a rotary electric machine according to the present invention.

FIG. 15 is a schematic illustration of the fourteenth embodiment of a rotary electric machine according to the present invention.

[Configuration]

The fourteenth embodiment of the present invention is characterized in that the above-described thirteenth embodiment is partly altered for this embodiment. More specifically, while the above-described pure water supply system 36 generally produces pure water by means of ion exchange resin, the ion exchange rate of such ion exchange resin decreases to make the specific resistance unsatisfactory when the temperature of the pure water is significantly low.

In view of this problem, in this embodiment, the pure water cooler is divided into two units, or an upstream side pure water cooler 37b and a downstream side pure water cooler 37a of the water-cooled stator coil 38, as shown in FIG. 15. The low temperature second coolant 15 obtained by means of the heat pump 18 (or freezer) is supplied to the pure water coolers 37a, 37b to cool the pure water to be used for cooling the water-cooled stator coil 38. The pure water coolers 37a, 37b are designed optimally in such a way that the pure water cooler 37b arranged at the upstream side of the water-cooled stator coil 38 produces low temperature pure water necessary for cooling the water-cooled stator coil 38, while the pure water cooler 37a cools pure water to the temperature level necessary for the pure water supply system 36.

With the arrangement of FIG. 15, the pure water cooler 37a and the second coolant circulation system piping P1 of the pure water coolers 37b are connected in series, and the pure water cooler 37b arranged at the upstream side of the water-cooled stator coil 38 is arranged at the upstream side of the second coolant circulation system 14. Otherwise, this embodiment is same as that of FIG. 14.

[Operation]

The operation of this embodiment having the above-described configuration will be described below.

With the arrangement of FIG. 15, the pure water produced by the pure water producing system 36 exchanges heat in the pure water cooler 37b arranged at the upstream side of the water-cooled stator coil 38 with the second coolant 15 supplied from the second coolant circulation system 14. The pure water is cooled there, and the cooled pure water is then supplied to the water-cooled stator coil 38. The pure water is then warmed as a result of cooling the water-cooled stator coil 38 there. Then, it exchanges heat once again in the pure water cooler 37a with the second coolant 15 supplied from the second coolant circulation system 14 to become cooler. Then, the cooled pure water is circulated to the pure water supply system 36.

Otherwise, the operation of this embodiment is same as that of the embodiment of FIG. 14.

[Advantages]

In this embodiment pure water coolers are arranged respectively at the upstream side and at the downstream side of the water-cooled stator coil 38 to cool pure water in two steps. Therefore, it is possible to design the pure water coolers 37a, 37b optimally in such a way that the pure water cooler 37b arranged at the upstream side of the water-cooled stator coil 38 obtains low temperature pure water necessary to cool the water-cooled stator coil 38 while the pure water cooler 37a cools pure water to the temperature level necessary for the pure water supply system 36. Thus, it is possible to efficiently utilize the low temperature second coolant obtained by the second coolant circulation system 14.

The flow rate of the second coolant that circulates to the second coolant circulation system 14 can be suppressed to a low level by arranging the two pure water coolers 37a and 37b in series. Then, it is possible to downsize the equipment.

Additionally, as pointed out above, the temperature of the second coolant supplied to the pure water cooler 37b arranged at the upstream side needs to be held lower than the second coolant supplied to the pure water cooler 37a. It is possible for pure water to more efficiently exchange heat with the second coolant 15 when the pure water cooler 37b is arranged at the upstream side of the pure water cooler that is piped in series to the second coolant circulation system 14. Otherwise, this embodiment provides advantages similar to those of the embodiment of FIG. 14.

Fifteenth Embodiment

Figure 16:
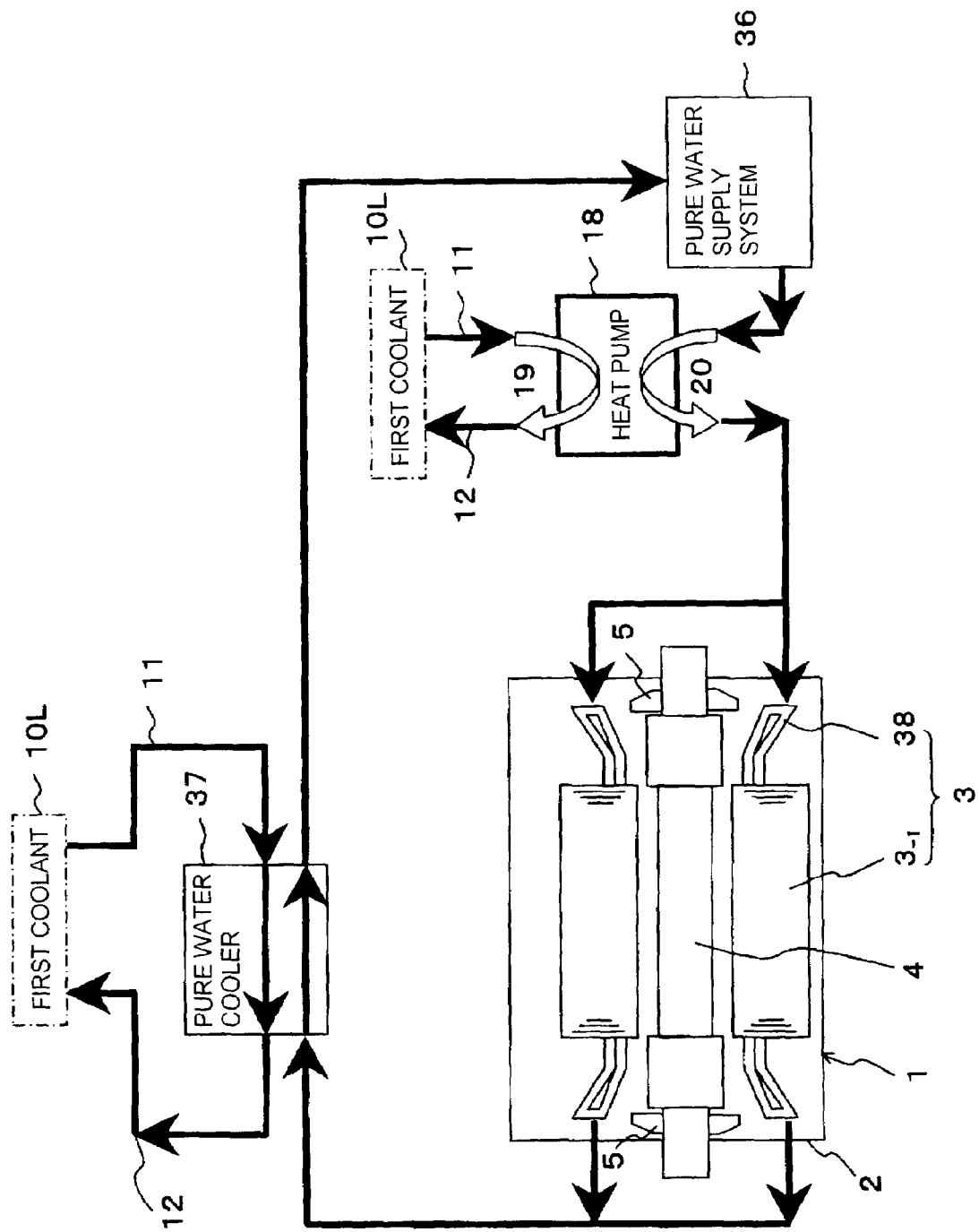
FIG. 16 is a schematic illustration of a fifteenth embodiment of a rotary electric machine according to the present invention.

FIG. 16 is a schematic illustration of the fifteenth embodiment of a rotary electric machine according to the present invention.

[Configuration]

The fifteenth embodiment of the present invention is characterized in that it is so arranged that the pure water that has become warmer as a result of cooling the water-cooled stator coil 38 is cooled by a pure water cooler 37 and is subsequently further cooled by the heat pump 18. Thus, while the high temperature heat source 19 of the heat pump 18 is the first coolant 10L like the preceding embodiments, the low temperature heat source 20 differs from those of the preceding embodiments and the second coolant 15 is replaced by pure water for cooling the stator coil.

Alternatively, the first coolant system 10 for supplying the first coolant to the condenser $18_{-19}$ of the heat pump 18 and the first coolant system 10 for supplying the first coolant to the pure water cooler 37 may be connected in series (not shown).

[Operation]

The operation of this embodiment having the above-described configuration will be described below.

With the arrangement of FIG. 16, the pure water produced form the pure water producing system 36 is directly supplied to the evaporator $18_{-20}$ of the heat pump 18 to obtain low temperature pure water. Then, the obtained low temperature pure water is supplied to the water-cooled stator coil 38 by means of the headers. The pure water is heated as a result of cooling the water-cooled stator coil 38. Then, the pure water exchanges heat in the pure water cooler 37 with the first coolant supplied from the first coolant system 10 to become cooled and circulated to the pure water supply system 36.

[Advantages]

With this fifteenth embodiment, pure water for cooling the water-cooled stator coil 38 is directly supplied to the condenser $18_{-20}$ of the heat pump 18. Thus, it is possible to secure low temperature pure water without providing a second coolant circulation system 14. Then, the water-cooled stator coil 38 is efficiently cooled. Additionally, the first coolant system 10 for supplying the first coolant to the condenser $18_{-19}$ of the heat pump 18 and the first coolant system 10 for supplying the first coolant to the pure water cooler 37 may be connected in series. In such a case, it is possible to design the rotary electric machine so as to minimize the required flow rate of the first coolant systems that are connected in series.

Sixteenth Embodiment

Figure 17:
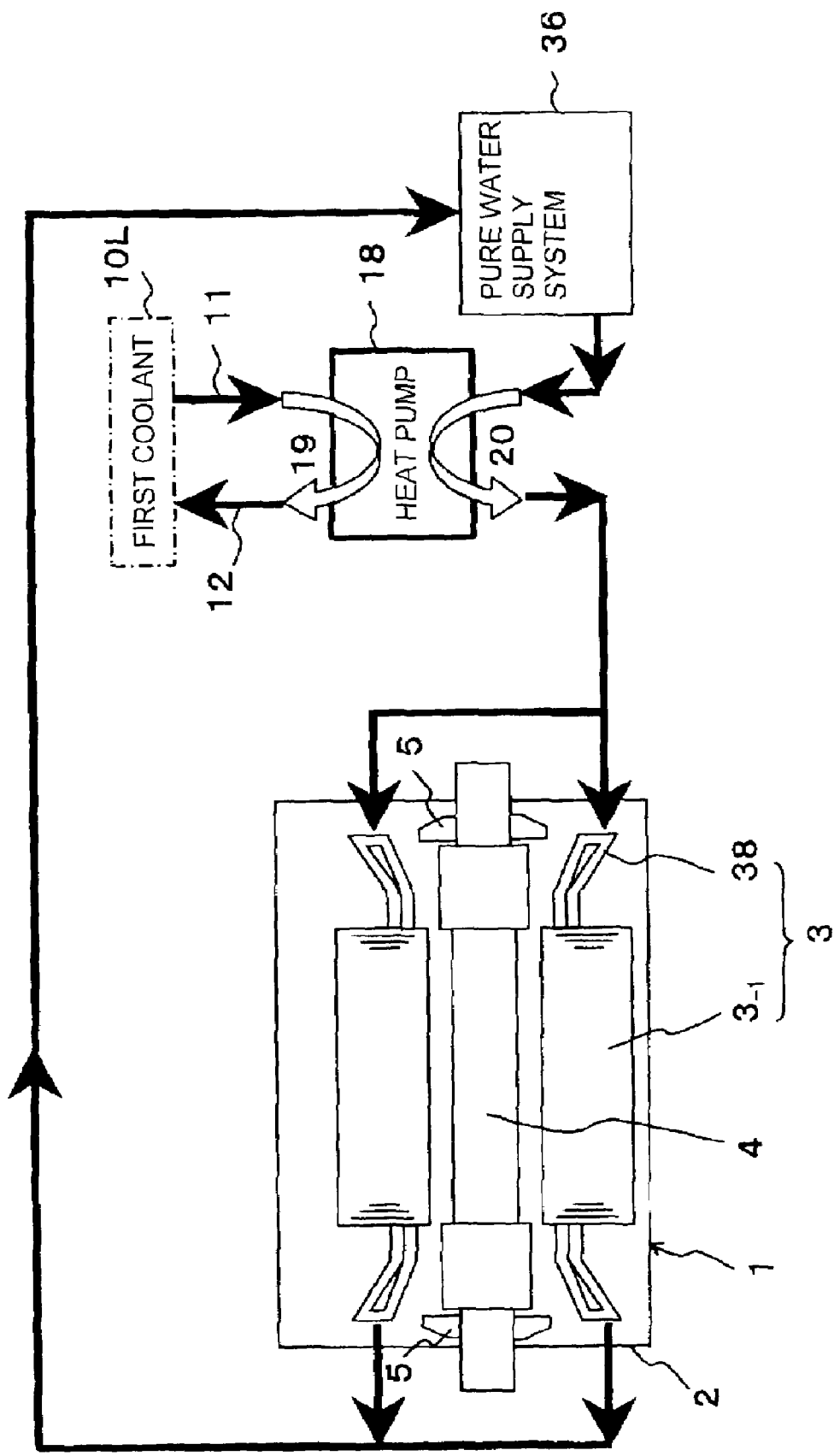
FIG. 17 is a schematic illustration of a sixteenth embodiment of a rotary electric machine according to the present invention.

FIG. 17 is a schematic illustration of the sixteenth embodiment of a rotary electric machine according to the present invention.

[Configuration]

The sixteenth embodiment of the present invention is characterized in that the pure water cooler 37 of the above-described fifteenth embodiment is omitted and the pure water for cooling the water-cooled stator core is cooled only by means of the heat pump 18 (or freezer).

[Operation]

The operation of this embodiment having the above-described configuration will be described below.

With the arrangement of FIG. 17, the pure water produced by the pure water producing system 36 is directly supplied to the evaporator $18_{-20}$ of the heat pump 18 to obtain low temperature pure water. The obtained low temperature pure water is then supplied to the water-cooled stator coil 38 by means of the headers. The pure water that has become warmer as a result of cooling the water-cooled stator coil 38 is circulated to the pure water supply system 36 once again.

[Advantages]

Since this embodiment does not require a pure water cooler 37, the configuration of the entire machine is simplified and it is possible to provide a highly reliable cooling apparatus of a rotary electric machine.

Seventeenth Embodiment

Figure 18:
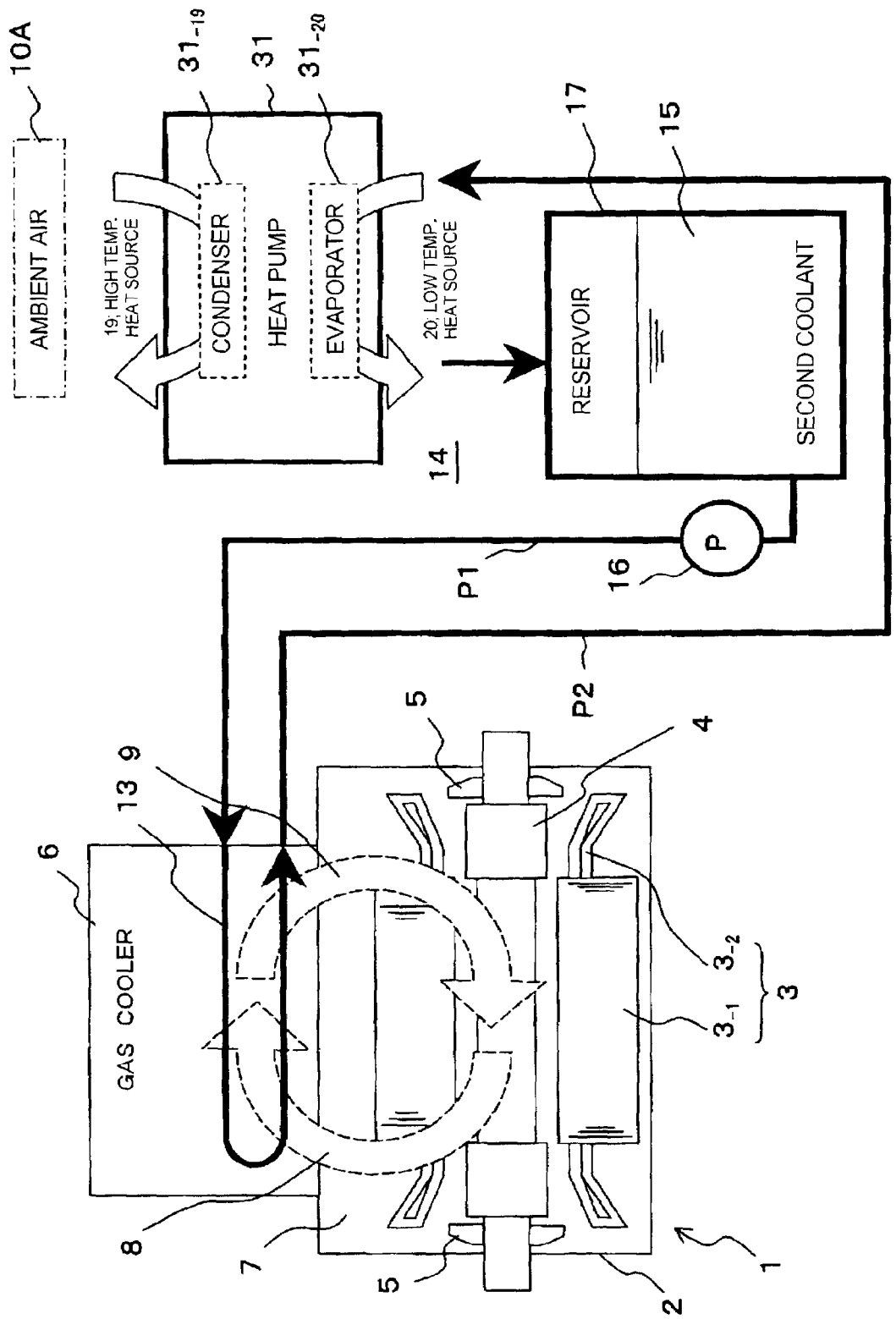
FIG. 18 is a schematic illustration of a seventeenth embodiment of a rotary electric machine according to the present invention.

FIG. 18 is a schematic illustration of the seventeenth embodiment of a rotary electric machine according to the present invention.

[Configuration]

The seventeenth embodiment of the present invention is characterized in that it employs a so-called air-cooled type heat pump 31 as shown in FIG. 18. This heat pump 31 utilizes ambient air 10A surrounding the heat pump 18 in place of main cooling water for the first coolant to be supplied to a condenser $31_{-19}$ of the heat pump 31. In FIG. 18, reference numeral "$31_{-19}$" denotes a condenser and reference numeral "$31_{-20}$" denotes an evaporator. Since an air-cooled type heat pump 31 is adopted in this embodiment, the main water cooling system 10 in any of the preceding embodiments is not required.

[Operation]

The operation of this embodiment having the above-described configuration will be described below.

Like the first embodiment, the pressure of the second coolant 15 stored in the reservoir 17 is raised by the circulation pump 16. Then, the second coolant 15 is supplied to the cooling tube 13 that is the heat exchange section of the gas cooler 6 by way of the supply piping P1 to cool the cooling gas 7. After cooling the cooling gas 7, the second coolant 15 is fed to the evaporator $31_{-20}$ of the heat pump 31 by way of the return piping P2 as low temperature heat source 20. The second coolant 15 that is supplied to the evaporator $31_{-20}$ as low temperature heat source 20 is deprived of heat due to the operation of the heat pump 31 and is cooled. Then, the second coolant 15 is ejected into the reservoir 17. On the other hand, air fed to the heat pump 31 by means of a fan or the like (not shown) deprives heat from the condenser $31_{-19}$ to become hot air before it is discharged to a duct or the like (not shown).

[Advantages]

Since this embodiment employs an air-cooled heat pump 31 and uses ambient air as high temperature heat source 19, it does not require a main cooling water system to simplify the configuration of the machine so much. Thus, it is possible to provide a highly reliable cooling apparatus of a rotary electric machine.

What is claimed is:

1. A rotary electric machine comprising:
    a stator;
    a rotor;
    rotor fans;
    a closed type frame containing the stator, the rotor and the rotor fans;
    a gas cooler for cooling gas that has been warmed as a result of being circulated in the frame by the rotor fans and exchanging heat with the stator and the rotor;
    a heat pump utilizing a first coolant as a high temperature heat source and a second coolant as a low temperature heat source; and
    a second coolant circulation system for supplying the second coolant to a heat exchange section of the gas cooler; wherein
    the second coolant is cooled by the heat pump and supplied to the heat exchange section of the gas cooler by the second coolant circulation system.

2. The rotary electric machine according to claim 1, wherein the second coolant circulation system includes:
    a reservoir for storing the second coolant;
    a liquid coolant gas cooler circulation system for circulating liquid coolant to the gas cooler; and
    a liquid coolant heat pump circulation system for circulating liquid coolant to the heat pump.

3. The rotary electric machine according to claim 2, wherein at least either the supply piping for drawing out liquid coolant from the reservoir or the return piping for returning liquid coolant to the reservoir of the liquid coolant gas cooler circulation system and the liquid coolant heat pump circulation system is made a common piping and a circulation pump is arranged at the common piping.

4. The rotary electric machine according to claim 2, wherein the second coolant circulation system has a branch point downstream of the gas cooler for branching out a circulation route to the heat pump, and a route to the reservoir.

5. The rotary electric machine according to claim 2, wherein:

the gas cooler is divided by two or more than two; and the liquid coolant gas cooler circulation system is connected to part of the gas cooler to supply liquid coolant circulating from the reservoir to the gas cooler, while the liquid coolant heat pump circulation system is connected to the remaining part of the gas cooler to supply liquid coolant circulating from the reservoir to the heat pump.

6. The rotary electric machine according to claim 2, wherein the first coolant is supplied from a first coolant system to the reservoir and then from the reservoir to the gas cooler so as to return the liquid coolant that has been used for heat exchange to the first coolant system.

7. The rotary electric machine according to claim 2, wherein:

the gas cooler is divided by two or more than two; and the second coolant is supplied from the second coolant circulation system to part of the gas cooler, while the first coolant is supplied from a first coolant system to the remaining part of the gas cooler.

8. The rotary electric machine according to claim 1, wherein:

the gas cooler is divided by two or more than two; and the second coolant is supplied from the second coolant circulation system to part of the gas cooler, while the first coolant supplied to the heat pump as a high temperature heat source is supplied to the remaining part of the gas cooler.

9. The rotary electric machine according to claim 1, wherein air is used as the cooling gas in the rotary electric machine and a dehumidifier is arranged at a part thereof where rotor shaft end sections penetrate the closed type frame.

10. The rotary electric machine according to claim 9, wherein a thermally conductive plate is arranged at a part where the rotor penetrates the closed type frame and liquid coolant is made to flow around and cool the thermally conductive plate.

11. The rotary electric machine according to claim 10, wherein the liquid coolant ejected from the low temperature heat source exit of the heat pump is used as liquid coolant that is made to flow to the thermally conductive plate.

* * * * *